(12) United States Patent
Ito et al.

(10) Patent No.: US 7,337,130 B2
(45) Date of Patent: Feb. 26, 2008

(54) METHODS FOR AUTOMATICALLY PROVIDING A PERSONALIZED PRODUCT

(75) Inventors: Eiichi Ito, Kasugai (JP); Hiroshi Takami, Nagoya (JP); Teruyo Katsuno, Nagoya (JP); Shinji Kobayashi, Toukai (JP); Koji Sugiyama, Nagoya (JP); Naohito Asai, Nagoya (JP); Toshihide Fujikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 335 days.

(21) Appl. No.: 09/812,556

(22) Filed: Mar. 21, 2001

(65) Prior Publication Data

US 2001/0049669 A1    Dec. 6, 2001

(30) Foreign Application Priority Data

Mar. 21, 2000  (JP)  ............................ 2000-083219
Mar. 21, 2000  (JP)  ............................ 2000-083221
Mar. 21, 2000  (JP)  ............................ 2000-083222

(51) Int. Cl.
    *G06Q 30/00*    (2006.01)
(52) U.S. Cl. ...................................... 705/26
(58) Field of Classification Search ............. 705/26, 705/27
    See application file for complete search history.

(56) References Cited

U.S. PATENT DOCUMENTS

| 4,970,554 | A | * | 11/1990 | Rourke | 399/84 |
| 5,006,983 | A | * | 4/1991 | Wayne et al. | 705/8 |
| 5,495,430 | A | * | 2/1996 | Matsunari et al. | 703/6 |
| 5,570,291 | A | * | 10/1996 | Dudle et al. | 700/95 |
| 5,606,507 | A | * | 2/1997 | Kara | 705/408 |
| 5,615,123 | A | * | 3/1997 | Davidson et al. | 700/233 |
| 5,717,597 | A | * | 2/1998 | Kara | 705/408 |
| 5,732,398 | A | * | 3/1998 | Tagawa | 705/5 |
| 5,748,484 | A | * | 5/1998 | Cannon et al. | 700/233 |
| 5,801,944 | A | * | 9/1998 | Kara | 705/401 |
| 5,870,718 | A | * | 2/1999 | Spector | 705/26 |
| 5,890,134 | A | * | 3/1999 | Fox | 705/9 |
| 5,930,768 | A |   | 7/1999 | Hooban | |

(Continued)

FOREIGN PATENT DOCUMENTS

EP    0 986 275 A1    7/1999

(Continued)

OTHER PUBLICATIONS

Rubber Stamps, www.rubberstamps.com, Feb. 2, 1999, pp. 1-5.*

(Continued)

*Primary Examiner*—Jeffrey A. Smith
*Assistant Examiner*—Mila Airapetian
(74) *Attorney, Agent, or Firm*—Oliff & Berridge, PLC

(57) ABSTRACT

A personalized product producing system enables customers to order a personalized product, such as a name card, a stamp, or a sticker/label, inexpensively and conveniently. Customers operate their own cellular phones to send personalized information to be engraved in a stamp or printed on a name card or sticker/label in the form of e-mail to a host computer. The host computer edits the information and sends personalized product producing data to a stamp personalized product producing device. The personalized product producing device produces a personalized product based on the received data.

13 Claims, 30 Drawing Sheets

U.S. PATENT DOCUMENTS

| | | | | |
|---|---|---|---|---|
| 5,930,810 | A * | 7/1999 | Farros et al. | 715/506 |
| 5,991,739 | A * | 11/1999 | Cupps et al. | 705/26 |
| 6,076,076 | A * | 6/2000 | Gottfreid | 705/45 |
| 6,134,548 | A * | 10/2000 | Gottsman et al. | 707/5 |
| 6,144,917 | A * | 11/2000 | Walters et al. | 701/204 |
| 6,161,099 | A * | 12/2000 | Harrington et al. | 705/37 |
| 6,167,383 | A * | 12/2000 | Henson | 705/26 |
| 6,174,579 | B1 * | 1/2001 | Slyster et al. | 428/40.1 |
| 6,182,078 | B1 * | 1/2001 | Whitmyer, Jr. | 707/10 |
| 6,208,980 | B1 * | 3/2001 | Kara | 705/408 |
| 6,259,405 | B1 * | 7/2001 | Stewart et al. | 342/457 |
| 6,324,521 | B1 * | 11/2001 | Shiota et al. | 705/27 |
| 6,332,146 | B1 * | 12/2001 | Jebens et al. | 707/104.1 |
| 6,353,772 | B1 * | 3/2002 | Silverbrook | 700/233 |
| 6,397,197 | B1 * | 5/2002 | Gindlesperger | 705/37 |
| 6,415,156 | B1 | 7/2002 | Stadelmann | |
| 6,463,420 | B1 * | 10/2002 | Guidice et al. | 705/28 |
| 6,493,677 | B1 * | 12/2002 | von Rosen et al. | 705/27 |
| 6,519,632 | B1 * | 2/2003 | Brackett et al. | 709/219 |
| 6,535,294 | B1 * | 3/2003 | Arledge et al. | 358/1.15 |
| 6,539,080 | B1 * | 3/2003 | Bruce et al. | 379/88.17 |
| 6,587,835 | B1 * | 7/2003 | Treyz et al. | 705/14 |
| 6,587,839 | B1 * | 7/2003 | McIntyre et al. | 705/27 |
| 6,594,642 | B1 * | 7/2003 | Lemchen | 705/26 |
| 6,683,526 | B2 * | 1/2004 | Bellin | 340/3.43 |
| 6,704,120 | B1 * | 3/2004 | Leone, III et al. | 358/1.18 |
| 6,721,713 | B1 * | 4/2004 | Guheen et al. | 705/1 |
| 6,748,225 | B1 * | 6/2004 | Kepler | 455/456.2 |
| 6,842,533 | B1 * | 1/2005 | Patton et al. | 382/115 |
| 6,906,815 | B1 * | 6/2005 | Miyake et al. | 358/1.15 |
| 6,980,319 | B2 * | 12/2005 | Ohta | 358/1.18 |
| 2003/0208442 | A1 * | 11/2003 | Cockrill et al. | 705/40 |

FOREIGN PATENT DOCUMENTS

| | | | |
|---|---|---|---|
| JP | 408212310 | * | 8/1996 |
| JP | A-10-191453 | | 7/1998 |
| JP | A-11-78191 | | 3/1999 |
| JP | A-11-146118 | | 5/1999 |
| WO | WO 99/30257 | | 6/1999 |

OTHER PUBLICATIONS

Current Check, www.currentchecks.com, Mar. 8, 2000, pp. 1-9.*
Print USA, www.printusa.com, Feb. 2, 1999, pp. 1-5.*
Mapquest, www.mapquest.com, Nov. 27, 1999 (pp. 1-5); Jan. 29, 2000 (pp. 1-8); Feb. 29, 2000 (pp. 1-7); Mar. 4, 2000.*
AND, www.and.com, Aug. 15, 2000 (p. 1); Oct. 19, 2000 (pp. 1-3); Dec. 17, 2000 (pp. 1-6).*
Martha Stewart, "Make sure you have stamps", Houston Chronicle, Nov. 6, 1999, p. 6.*
Beth Teitell, Boston Herald, Boston, Mass.: Sep. 4, 1998, p. 059, Stamp-sized stickers get downright personal http://proquest.umi.com/pqdweb?index=2&did=33664125&SrchMode=1&sid=1&Fmt=3&VInst=PROD&VType=PQD&RQT=309&VName=PQD&TS=1192220096&clientld=19649.*

* cited by examiner

Fig. 12
101
HOW TO WRITE MAIL TO ORDER A STAMP
Enter the stamp type, name, and address in this order by delimiting each entry item by semicolon.
STAMP 1                           STAMP 2
 NAME          NAME  
ADDRESS                            ADDRESS
EXAMPLE OF ENTRY:
1; TARO SUZUKI;          TARO SUZUKI 
1-2-3 XX,    If mailed,  1-2-3 XX, ^^-KU, NAGOYA
^^-KU, NAGOYA
Your stamp will be:
Please send your mail to: 090-1234-5678

| | MAIL EDITING SOFTWARE | |
|---|---|---|
| No. | TITLE | TEL |
| 1 | STAMP ORDER | 090-7777-8888 |
| 2 | | |
| 3 | | |
| 4 | | |
| 5 | | |

Fig. 15
STAMP 1
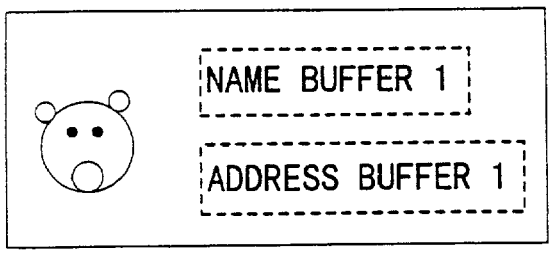
STAMP 2
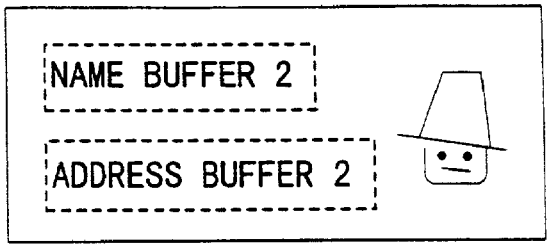
Fig. 16
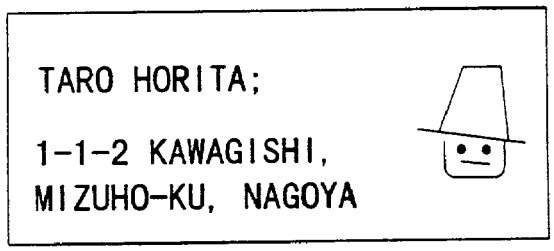
Fig. 17
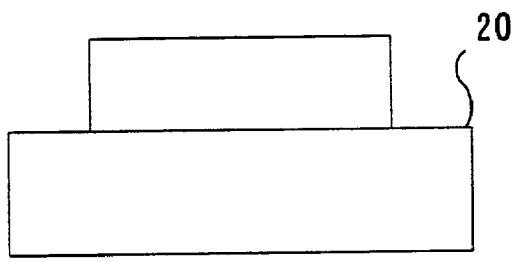

Fig.20
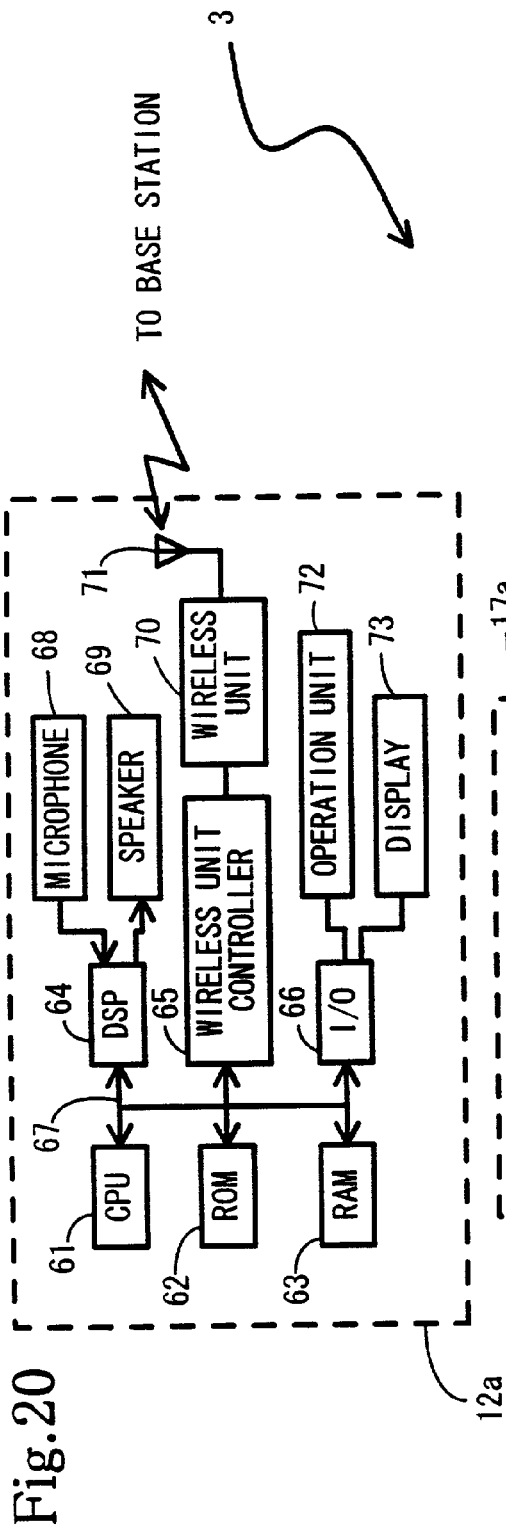
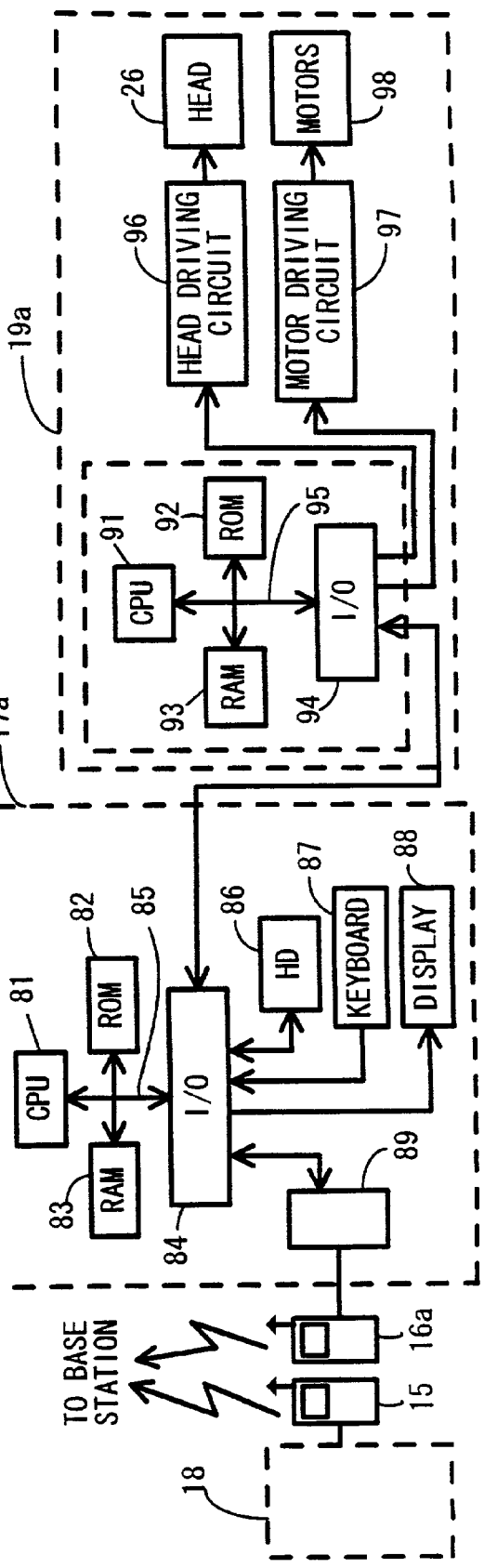

Fig. 33

| No. | TITLE | TEL | DELIVERY POINT |
|---|---|---|---|
| | MAIL EDITING SOFTWARE | | |
| 1 | STAMP ORDER | 090-7777-8888 | 1 |
| 2 | | | |
| 3 | | | |
| 4 | | | |
| 5 | | | |

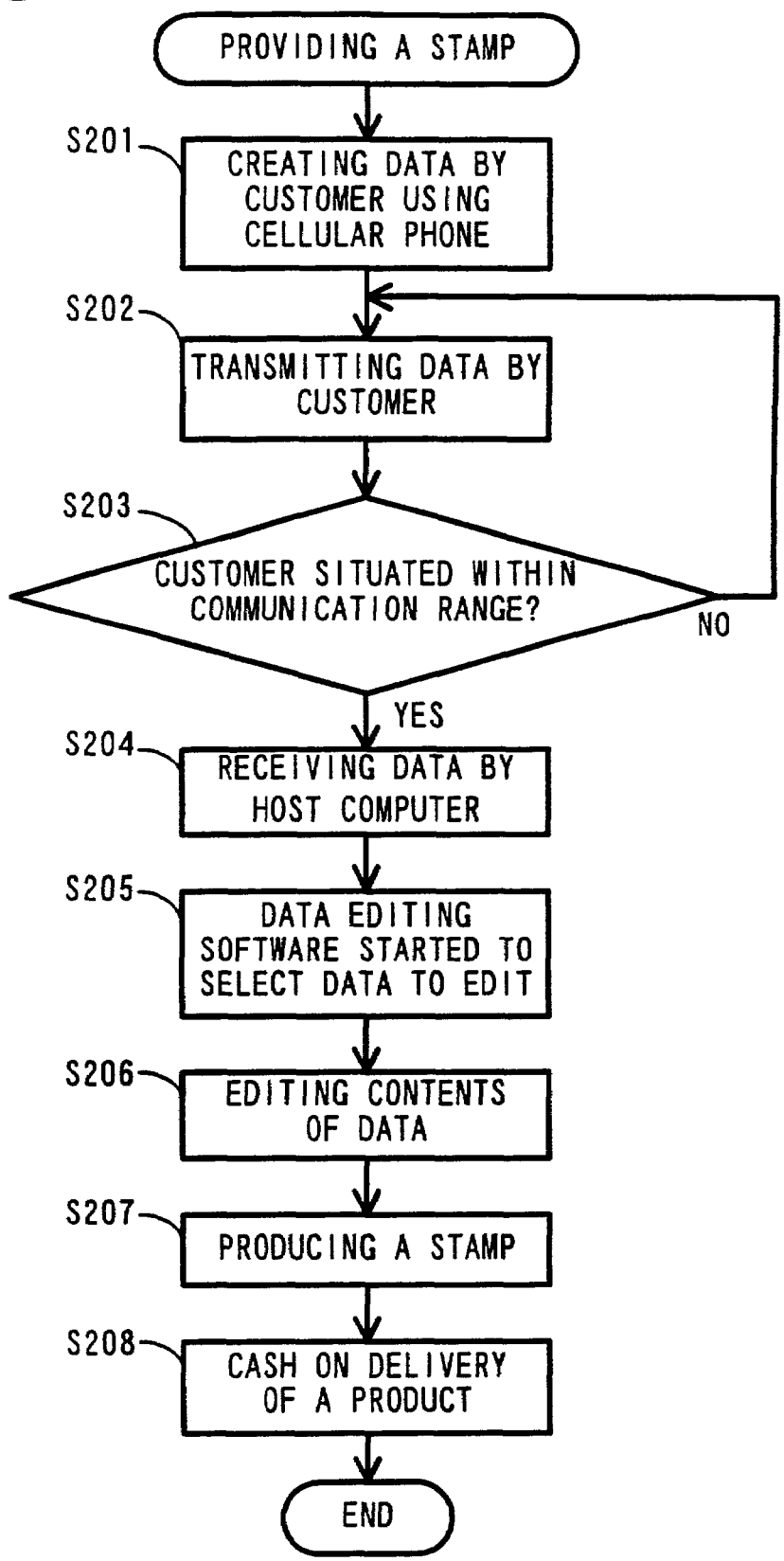

METHODS FOR AUTOMATICALLY PROVIDING A PERSONALIZED PRODUCT

BACKGROUND OF THE INVENTION

1. Field of Invention

The invention relates to systems and methods for providing a personalized product, such as an engraved stamp, a name card and a peel-off sticker/label, in response to a request from a customer.

2. Description of Related Art

In recent years, amusement facilities, such as a game arcade and an amusement park, are often provided with a name card producing device that produces a name card on which personal information including a customer's name and address is printed, a stamp producing device that produces a stamp by engraving an image on a stamp material based on personal information, and a sticker/label producing device that produces a peel-off sticker/label based on image data of, for example, a picture of a customer's face. Such devices are increasingly popular because, in many such devices, a cartoon character associated with the amusement park or a popular cartoon character can be printed on a name card or engraved on a stamp, together with the personal information, quickly and inexpensively.

Presently, when a customer uses the above-described name card or stamp producing device, the customer must go to a site where the device is installed and enter data, or fill out an order form, and then submit it to an operator of the device.

However, going to the site of such a device is bothersome for the customer. In addition, it is relatively time-consuming to enter data into the device or to fill out an order form. When many customers queue for the device, they must wait their turn. Thus, a drawback to such a device is that it takes a very long time to get a name card, an engraved stamp or a sticker/label. Another drawback to such a device is that when the customer fills out an order form, the device operator must enter the same data already entered on the order form.

SUMMARY OF THE INVENTION

The invention provides systems and methods that enable a customer to order a personalized product, such as a name card, an engraved stamp or a sticker/label, quickly and easily and that can also save the producer of personalized products both time and effort.

The invention substantially saves a customer both time and effort when ordering a personalized product. In addition, the producer of personalized products can produce a personalized product based on the data transmitted from the customer. This will substantially save the producer of personalized products the process of entering data and also allow the producer of personalized products to receive many orders from a number of customers without confusion. Furthermore, information related to the personalized product is generated and transmitted using a wireless data transmitter. Thus, a customer can order, for example, an engraved stamp conveniently from various locations at any time.

Various embodiments of the systems and methods of the invention may include an electronic mail (hereinafter referred to as e-mail) receiver that may receive e-mail from customers by wireless communication, each piece of e-mail containing data for an ordered product along with customer information; an e-mail receipt returning device that returns, upon receipt of each piece of e-mail by the e-mail receiver, an e-mail acknowledging receipt of each order to each of the customers based on the customer information; a data analyzer that analyzes the content of each piece of e-mail received by the e-mail receiver and converts the data of the ordered product to image data to be outputted to an output medium; a product producing device that receives the image data and outputs an image to the output medium; and an e-mail transmitter that transmits a piece of e-mail, to notify each customer that the ordered product has been produced by the product producing device.

BRIEF DESCRIPTION OF THE DRAWINGS

The invention will be described in detail with reference to exemplary embodiments and the following figures, wherein:

FIG. 12 shows an example of a brochure, previously supplied to customers, used with the first exemplary embodiment of the invention;

FIG. 15 shows an example of a difference, in name and address buffer-layouts, between two types of stamp-face designs used by the e-mail editing program;

FIG. 16 shows an example of a stamp-face layout produced according to an exemplary embodiment of the invention;

FIG. 17 is an external perspective view of a stamp, produced according to an exemplary embodiment of the invention;

FIG. 20 is a block diagram, showing a control system of the stamp producing system, according to the third exemplary embodiment of the invention;

FIG. 33 shows an example of a screen of the e-mail editing program, displayed on a display of the host computer in the third exemplary embodiment;

FIG. 36 is a main flowchart, showing stamp producing steps in the fourth exemplary embodiment of the invention.

DETAILED DESCRIPTION OF PREFERRED EMBODIMENTS

Exemplary embodiments of the invention will be described with reference to the accompanying drawings.

According to a first exemplary embodiment of the invention, a stamp producing system is provided which produces an engraved stamp from a thermoplastic porous material in response to an order from a customer. Referring to the schematic block diagram of FIG. 1, a general configuration of the stamp producing system, according to the first exemplary embodiment will be described.

Figure 1:
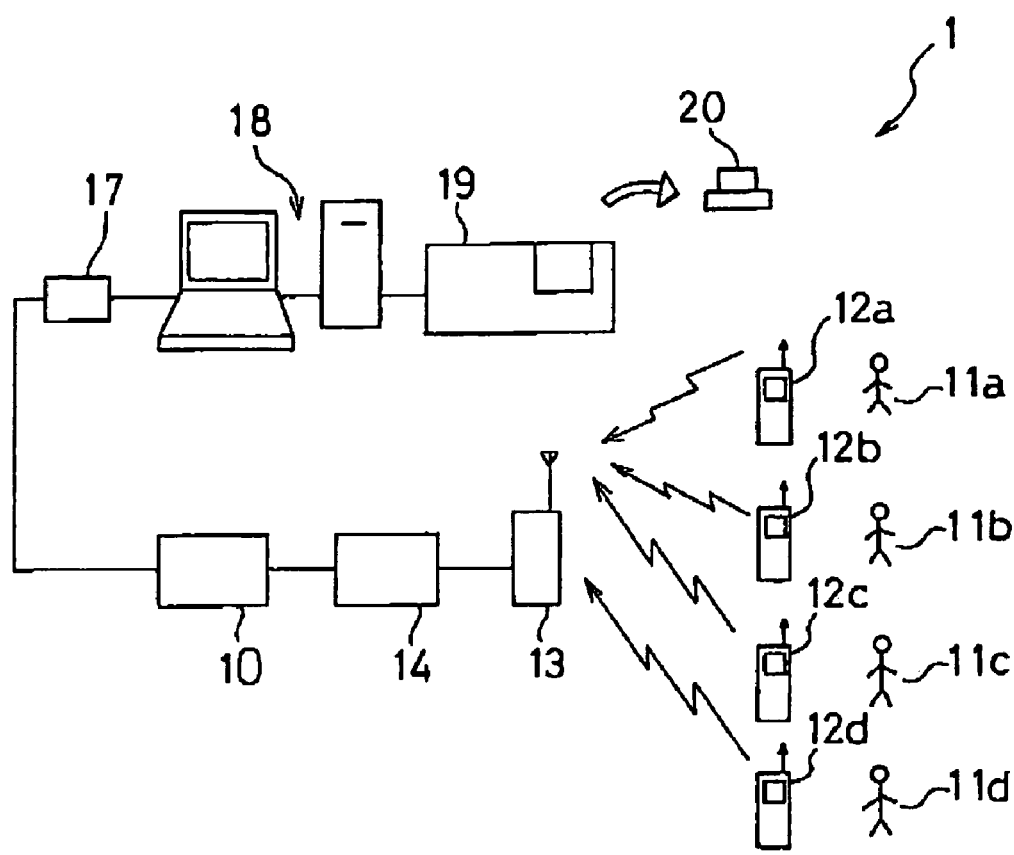
FIG. 1 is a schematic diagram showing a configuration of a stamp producing system, according to a first exemplary embodiment of the invention.

In the stamp producing system 1, shown in FIG. 1, a stamp producing device 19, located at a distance from a number of customers (only four customers 11a-11d are shown here by way of example), produces an engraved stamp 20, based on stamp producing data transmitted from cellular phones 12a-12d, which are portable wireless data receivers/transmitters operated by the respective customers 11a-11d. The cellular phones 12a-12d used in this exemplary embodiment have in addition a function of receiving/transmitting voice by digital or analog signals, a function of receiving/transmitting text information by coded data. For example, a cellular phone may convert text information to coded data for a message transmitting function, such as an e-mail transmitting function or the cellular phone may receive coded data, which is then converted to text information. Such reception and transmission of text messages may use e-mail that is provided on the Internet, access for which is provided by the cellular phone company.

Stamp producing data, sent from the cellular phones 12a-12d, are sent to a host computer 18, connected to the stamp producing device 19 in the form of e-mail. The e-mail text data contains, as will be described below, data to be engraved on a stamp material of the stamp 20. In this exemplary embodiment, the e-mail, containing text information, may be sent from the cellular phones 12a-12d to a base station 13 of the cellular phone service company, and then to a public line switching station 10 via a cellular phone switching station 14. In this exemplary embodiment, the e-mail is converted into analog signals at any one of these stations and sent, via a public line, to a modem 17 connected to the host computer 18. The modem 17 then converts the e-mail from analog to digital signals for processing by the host computer 18.

The host computer 18, as will be described in detail below, edits stamp-face data for producing an engraved stamp, based on the content of the e-mail. The edited stamp-face data is then sent to the stamp producing device 19. The stamp producing device 19, of the exemplary embodiment, may optically engrave an image on a stamp material, based on the data sent from the host computer 18, and produce the stamp 20 having the ordered stamp-face. Engraving of the stamp material by the stamp producing device may also occur by thermal, mechanical or other like processes that produce the ordered stamp-face.

In the first exemplary embodiment, the host computer 18 may constitute a data receiver, whereas the host computer 18 and the stamp producing device 19 in combination, may constitute a personalized product producing device.

Figure 2:
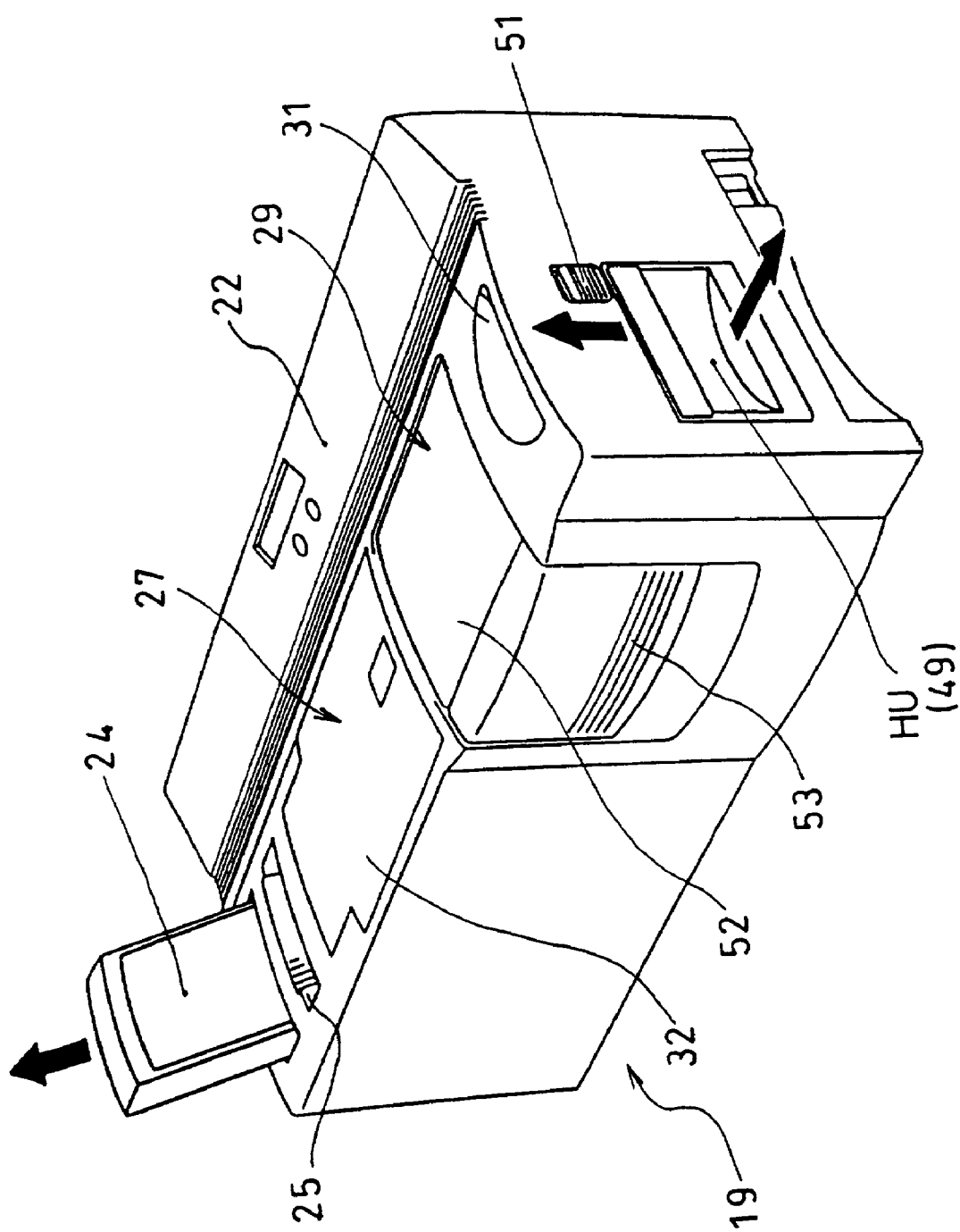
FIG. 2 is a general perspective view of the stamp producing device shown in FIG. 1.
Figure 3:
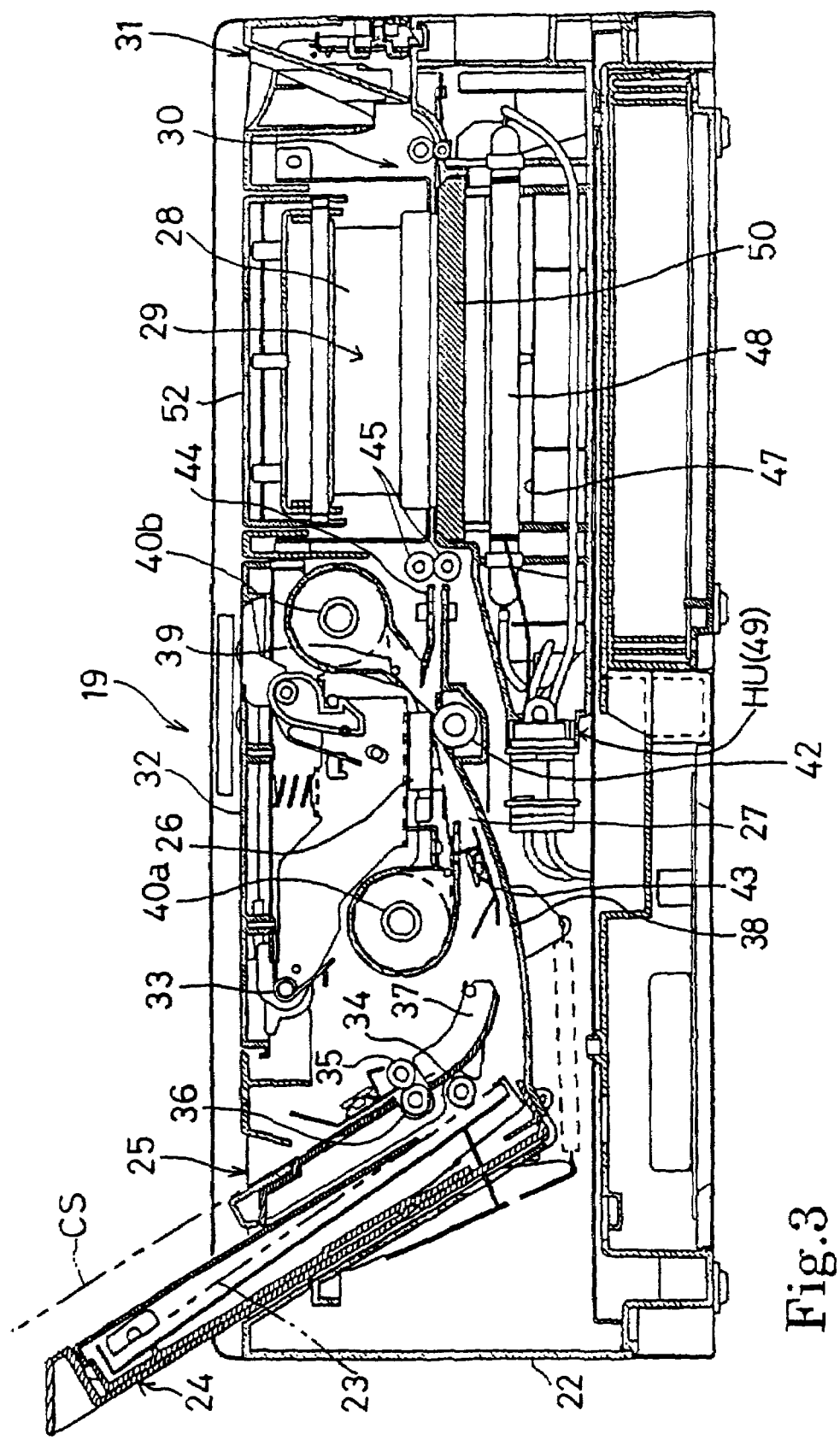
FIG. 3 is a general cross-sectional view of the stamp producing device shown in FIG. 1.

Referring to FIGS. 2 and 3, the structure of the stamp producing device 19 will be described. FIG. 2 is a general perspective view of the stamp producing device 19 shown in FIG. 1. FIG. 3 is a general cross-sectional view of the stamp producing device shown in FIG. 2. The stamp producing device 19 has a film magazine 24, that is removable from a device body 22 and which stores a number of original films 23. The stamp producing device 19 also has a supply port 25, located near the film magazine 24, for supplying cut sheets CS for stamp identification labels. The stamp producing device 19 also has a print unit 27 that is provided with a thermal printhead 26. The stamp producing device 19 also has a stamp unit 29 for forming a stamp-face on a stamp material (not shown) located at a lower surface of the stamp body 28, based on the printed original film 23. The stamp producing device 19 also has a stamp storage 30 for storing the stamp body 28 during stamp-face forming, and a discharge port 31 located near the stamp unit 29 in the device body 22 for discharging the cut sheets CS and the original films 23.

As shown in FIGS. 2 and 3, a head holder unit 32, provided on an upper surface of the print unit 27, has on its lower side a thermal printhead 26 that is upwardly pivotable about a shaft 33, thereby allowing maintenance of the device. A leading edge of the uppermost original film 23 in the film magazine 24 is pressed into contact with a supply roller 34. When the supply roller 34 is rotated, the original film 23 is properly fed to the print unit 27. The cut sheet CS is fed by a pair of feed rollers 35, 36 immediately behind the supply port 25 to the thermal printhead 26. A sheet guide 37 and a guide rail 38 also act to direct the cut sheet CS toward the thermal printhead 26.

The print unit 27 is provided with a supply roll 40a and a take-up roll 40b of thermal transfer ribbon 39 covered with a wax-base ink. A platen 42, provided below the thermal printhead 26, is located on the lower side of the head holder unit 32. Provided below the supply roll 40a, are the guide rail 38 for guiding the original film 23 and the cut sheet CS to a space between the thermal printhead 26 and the platen 42, and a presser guide 43 for preventing the original film 23 and the cut sheet-sheet CS from floating while being fed. In addition, downstream to the thermal printhead 26 are a transport guide 44 and a pair of supply rollers 45.

A removable light-emitting unit 49, provided with a xenon tube 48 and enclosed by a reflector box 47, is located below the stamp unit 29. The light emitting unit 49 may be removed from the stamp producing device 19 by sliding a slide lever 51 upward. The light emitting unit also has a stage 50 for holding the stamp body 28. The stamp unit 29 is also provided with a top cover 52 and a front top cover 53, which may be opened or closed for replacement of the stamp body 28.

The stamp producing device 19 is connected to the host computer 18 and executes, in various exemplary embodiments, various operations under the control of the host computer 18, such as: printing a positive image on the original film 23; printing an identification label on the cut sheet CS; and engraving an image on the stamp material, based on the positive image printed on the original film 23.

More specifically, in various exemplary embodiments, the thermal printhead 26 prints a positive image, comprising predetermined letters, graphics or the like, on the original film 23, which has been fed from the film magazine 24 to the print unit 27. The printed original film 23 is then fed to the stamp unit 29. The light emitting unit 49 irradiates the stamp material located beneath the stamp body 28 with light through the original film 23 having a positive image printed on it, to optically engrave the image on the stamp material.

In various exemplary embodiments, a positive image, including letters, graphics and the like, is printed by the thermal printhead 26 on the cut sheet CS fed from the supply port 25, instead of the original film 23, and the printed cut sheet CS is then discharged from the discharge port 31. The cut sheet CS may be pasted to the stamp body 28 as an identification label. In an alternative embodiment, the thermal printhead 26 may print a graphic image, a name, and an address on a personalized name card that replaces the cut sheet CS. Similarly, the thermal printhead may print a positive photographic image, for example, a photo of a person's face, on a sticker/label that replaces the cut sheet CS.

The structure of a stamp material located beneath the stamp body 28 will now be described. The stamp material used in this exemplary embodiment may have a double-layer structure, as disclosed in Japanese Laid-Open Patent Publication No. 11-78191, which belongs to the applicant of the present invention. The lower layer of the double layer structure may be made of a soft porous resin, for example, urethane resin, in which a light energy-absorbing material, for example, carbon black, or the like, is dispersed. The upper layer may be made of a hard porous resin, for example, polyvinyl acetal, in which ink is stored and to which a uniform pressure may be applied.

When such a compressed stamp material is irradiated with light through the positive image of the original film 23, a portion of the lower layer, corresponding to the transparent portion of the original film, is initially melted by heat generated from the light energy-absorbing material and then allowed to harden and seal, as an ink impermeable portion. In contrast, when a portion of the lower layer, corresponding to a printed portion of the original film, is not irradiated, neither melting nor subsequent hardening occurs and the material remains unsealed. As a result, a stamp having, on the lower surface of the stamp material, a pattern comprising a sealed portion (not to be printed) and an unsealed portion (to be printed) is formed.

Figure 4:
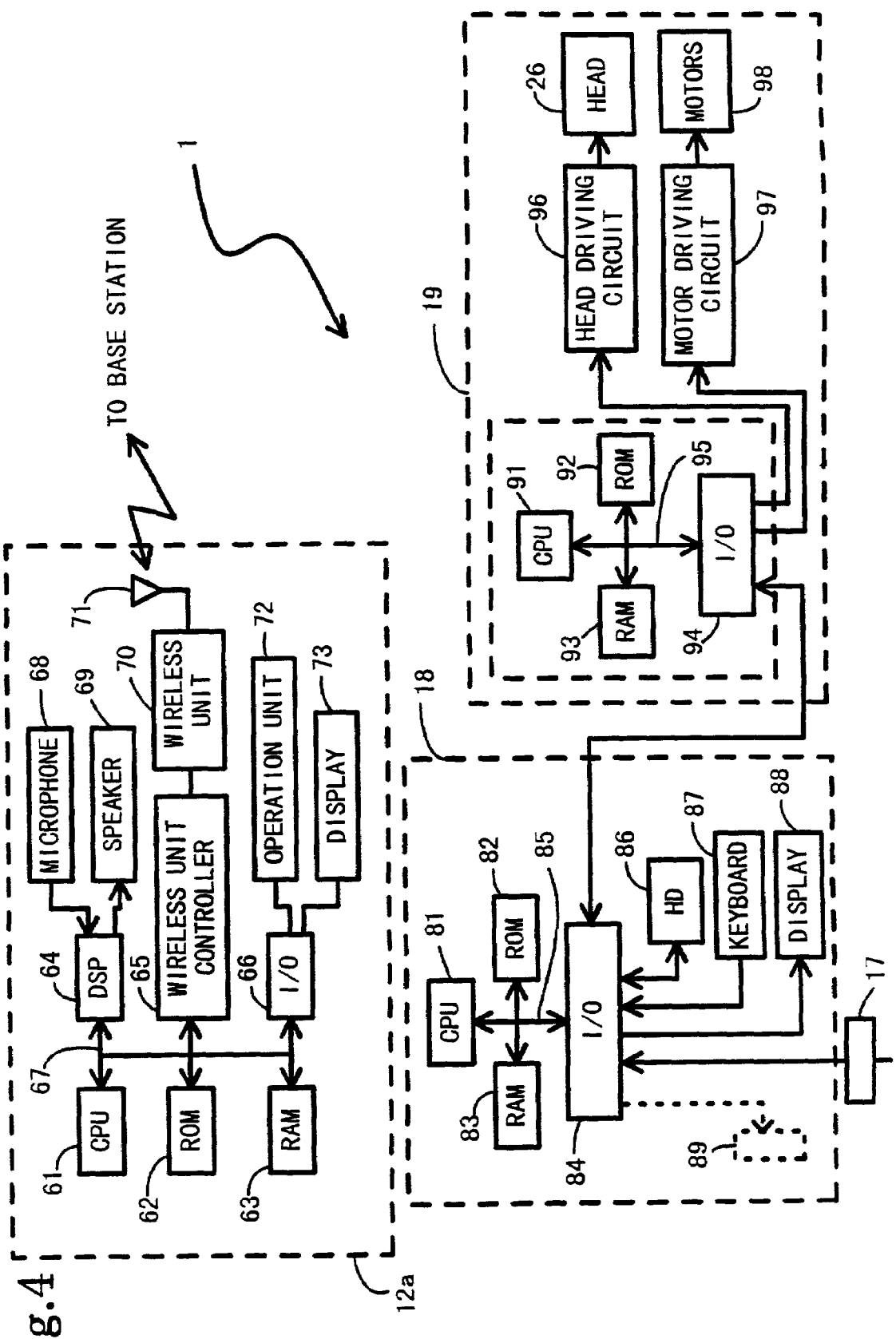
FIG. 4 is a block diagram showing a control system of the stamp producing system, according to the first exemplary embodiment of the invention.

Referring to FIG. 4, a control system of the stamp providing system 1 according to the first exemplary embodiment will be described. In FIG. 4, only one cellular phone 12a of a number of cellular phones, usable by the stamp producing system in this exemplary embodiment, is representatively shown and connection between the cellular phone 12a and the host computer 18 is omitted from the figure.

As shown in FIG. 4, the cellular phone 12a has, for example, a central processing unit (CPU) 61, a read-only memory (ROM) 62, a random-access memory (RAM) 63, a digital signal processor (DSP) 64, a wireless unit controller 65, and an input/output (I/O) interface 66. These components are connected to each other using a bus 67. The ROM 62 may be a rewritable nonvolatile solid-state memory, for example, a flash memory or a similar memory component, for storing a cellular phone operation program, a kana-kanji conversion program, and other programs. The RAM 63 is a volatile solid-state memory for storing text data, created by an operator of the cellular phone 12a and other data used in operation of the cellular phone.

The DSP 64 may be, for example, a voice processor connected to a microphone 68 and a speaker 69 via A/D and D/A converters (not shown). The wireless unit controller 65 may control operation of a wireless unit 70, based on signals from the CPU 61. The wireless unit 70 may transmit voice data, text data and coded data as digital or analog signals, to a base station via an antenna 71. Conversely, the wireless unit 70 may also receive data transmitted from the base station via the antenna 71.

Connected to the I/O interface 66 are an operation unit 72, including alphanumeric keys and a call key, and a display 73, on which numbers, letters and symbols inputted from the operation unit 72 or received by the wireless unit 70 are displayed. The operator of the cellular phone 12a may create an arbitrary letter string including letters of various languages, kana (Japanese syllabary), kanji (Chinese character), numbers, and symbols. Data, comprising the created letter string as well as an identifier used for identifying an individual cellular phone, for example, a phone number of the cellular phone 12, is transmitted to the host computer 18 via the base station 13.

In various exemplary embodiments, the host computer 18 may have a CPU 81, a ROM 82, a RAM 83 and an I/O interface 84. These components may be connected to each other, for example, by a bus 85. Connected to the I/O interface 84 may be a hard disk 86, a keyboard 87, a display 88, and a modem 17.

In various exemplary embodiments, the display 88 may display a screen for editing e-mail received from one or more cellular phones, a stamp-face generating screen including a stamp-face image to be engraved by the stamp producing device 19, and other screens for editing information and producing personalized products. The keyboard 87 may be connected as part of an input device. Other input devices, for example, a mouse, a trackball, a touch pad or the like may also be connected to the I/O interface 84.

The hard disk 86 may magnetically or optically store an e-mail editing program for editing e-mail received from the cellular phones, a program for exchanging data with the stamp producing device 19, and other programs. The RAM 83 may temporarily store programs read from the hard disk 86, received e-mail, data entered from the keyboard 87 or other input devices, and other data used in operation of the personalized product producing system. The RAM 83, as will be described later, may be provided with, for example, name buffers 0-2, address buffers 0-2, a stamp type buffer, and a memory area for various pointers.

In various exemplary embodiments, the stamp producing device 19 may be provided with a CPU 91, a ROM 92, a RAM 93, and an I/0 interface 94. These devices may be connected to each other, for example, by a bus 95. The I/0 interface 94 may be connected to the I/0 interface 84 of the host computer 18 via a cable or any means of electric communication, for example, a wireless transmitter/receiver. This allows the stamp producing device 19 to retrieve stamp-face data edited, according to this exemplary embodiment, from the host computer 18. Also connected to the I/O interface 94 are a head driving circuit 96 and a motor driving circuit 97. A thermal printhead 26 is connected to the head driving circuit 96, while motors 98 variously located in the stamp producing device 19 for driving the thermal head 26 and various rollers are connected to the motor driving circuit 97.

In various exemplary embodiments, the ROM 92 may store a control program for controlling the entire operation of the stamp producing device 19. The RAM 93 may store stamp producing data provided from the host computer 18. The RAM 93 may provide an image buffer for storing dot matrix data generated by the stamp producing data.

In various exemplary embodiments, the CPU 91 may control the head driving circuit 96 and the motor driving circuit 97, based on the control program stored in the ROM 92 and the dot matrix data stored in the image buffer of the RAM 93. Thereby, an ordered stamp-face image may be printed by the thermal printhead 26 on the original film 23 or the cut sheet CS, and the original film 23 may be used for engraving the stamp-face image on the stamp material.

Figure 5:
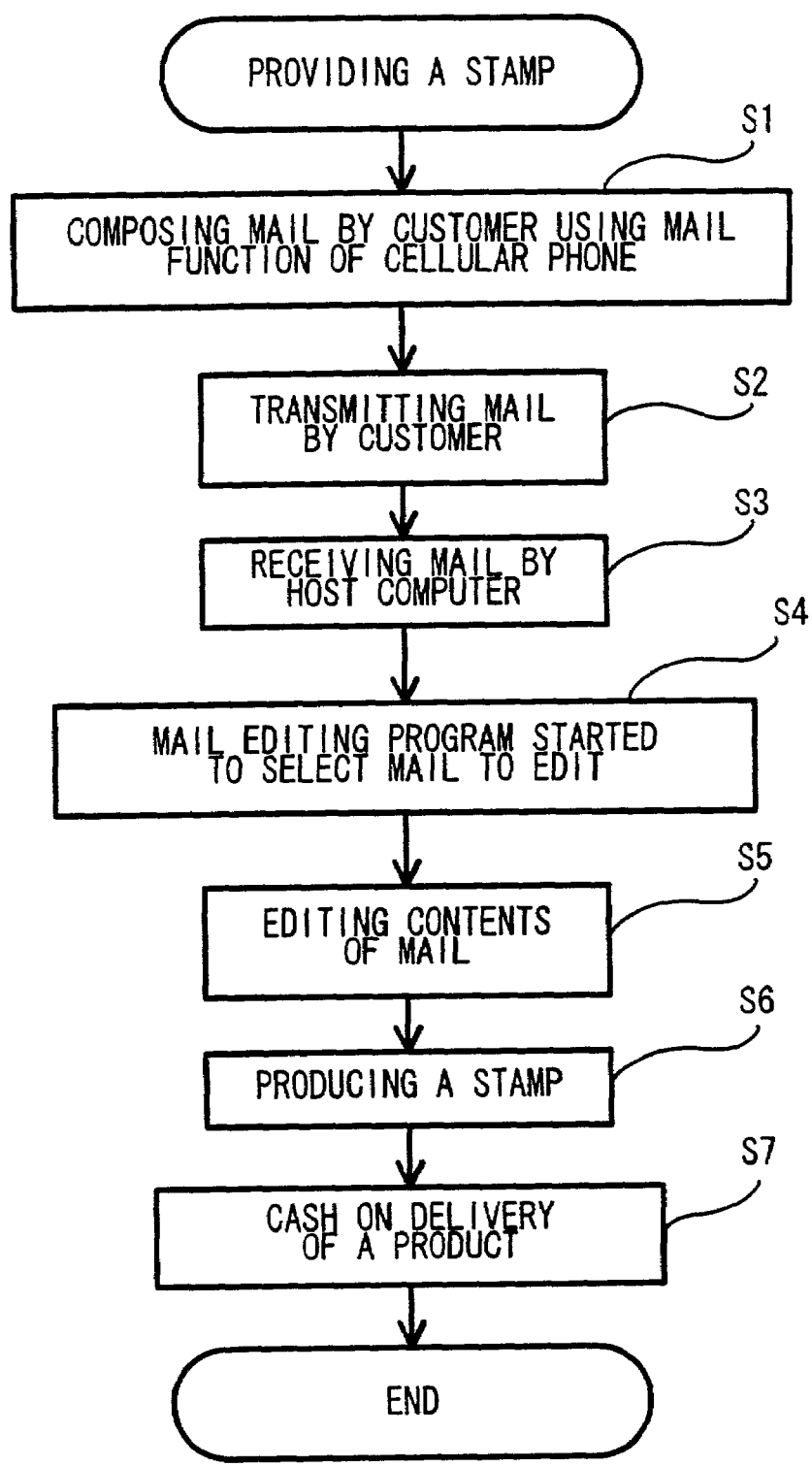
FIG. 5 is a main flowchart showing stamp producing steps, in the first exemplary embodiment of the invention.
Figure 6:
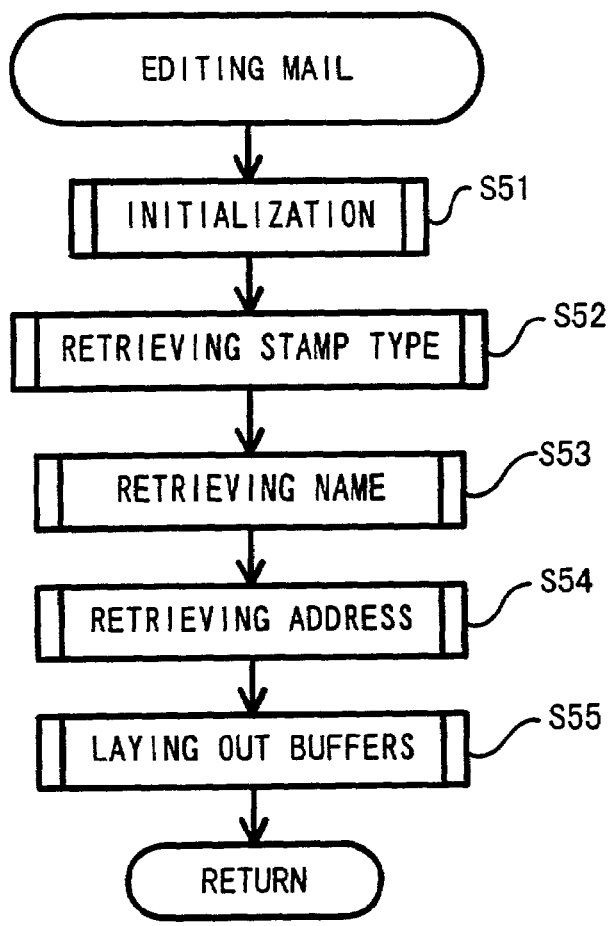
FIG. 6 is a flowchart, showing the e-mail editing process of FIG. 5 executed by a host computer.
Figure 7:
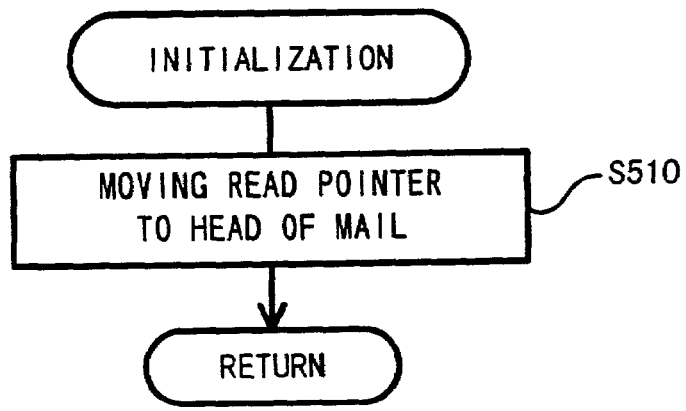
FIG. 7 is a flowchart of an initialization subroutine in the e-mail editing process of FIG. 6.
Figure 9:
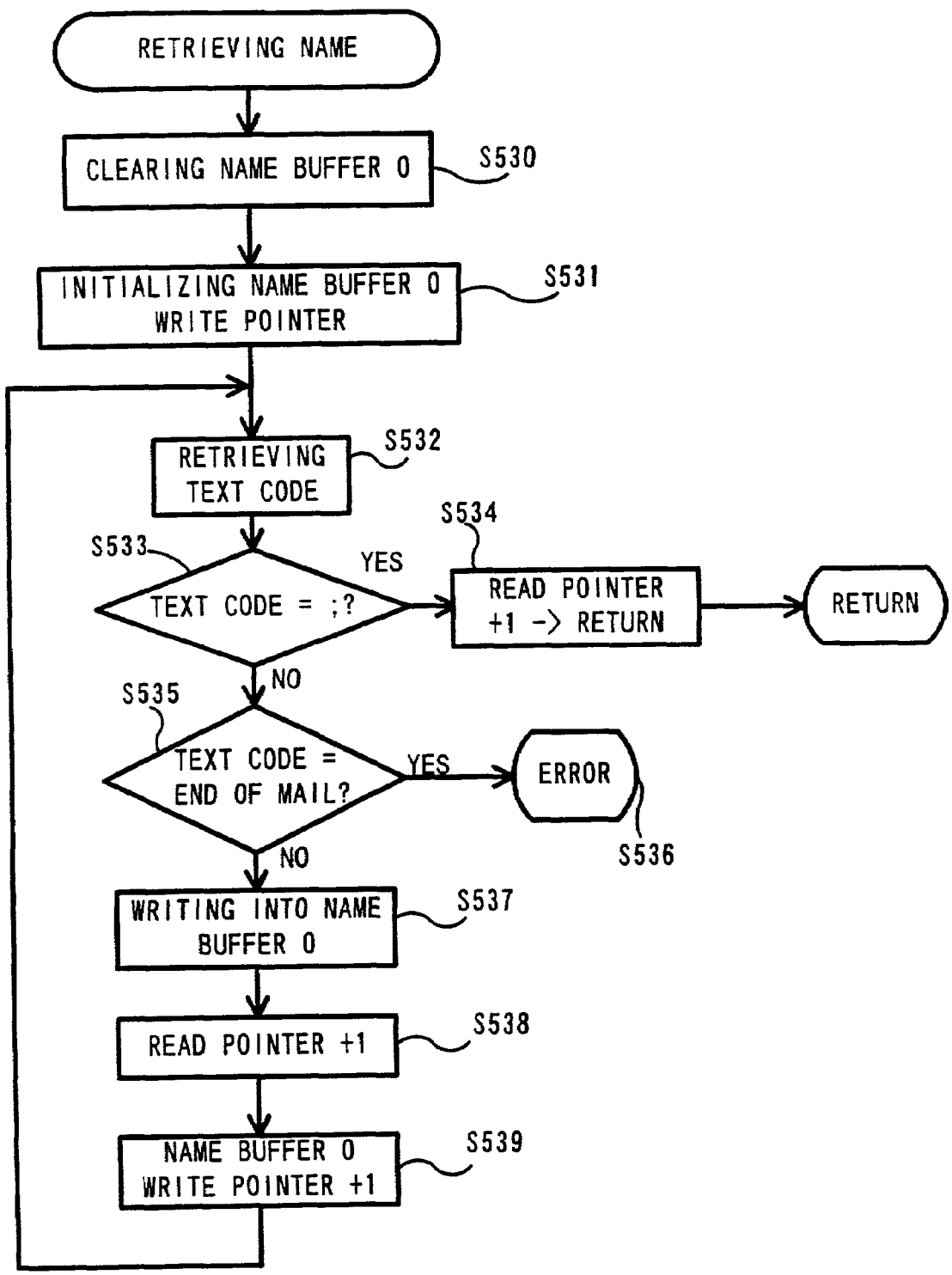
FIG. 9 is a flowchart of a name retrieving subroutine in the e-mail editing process of FIG. 6.
Figure 10:
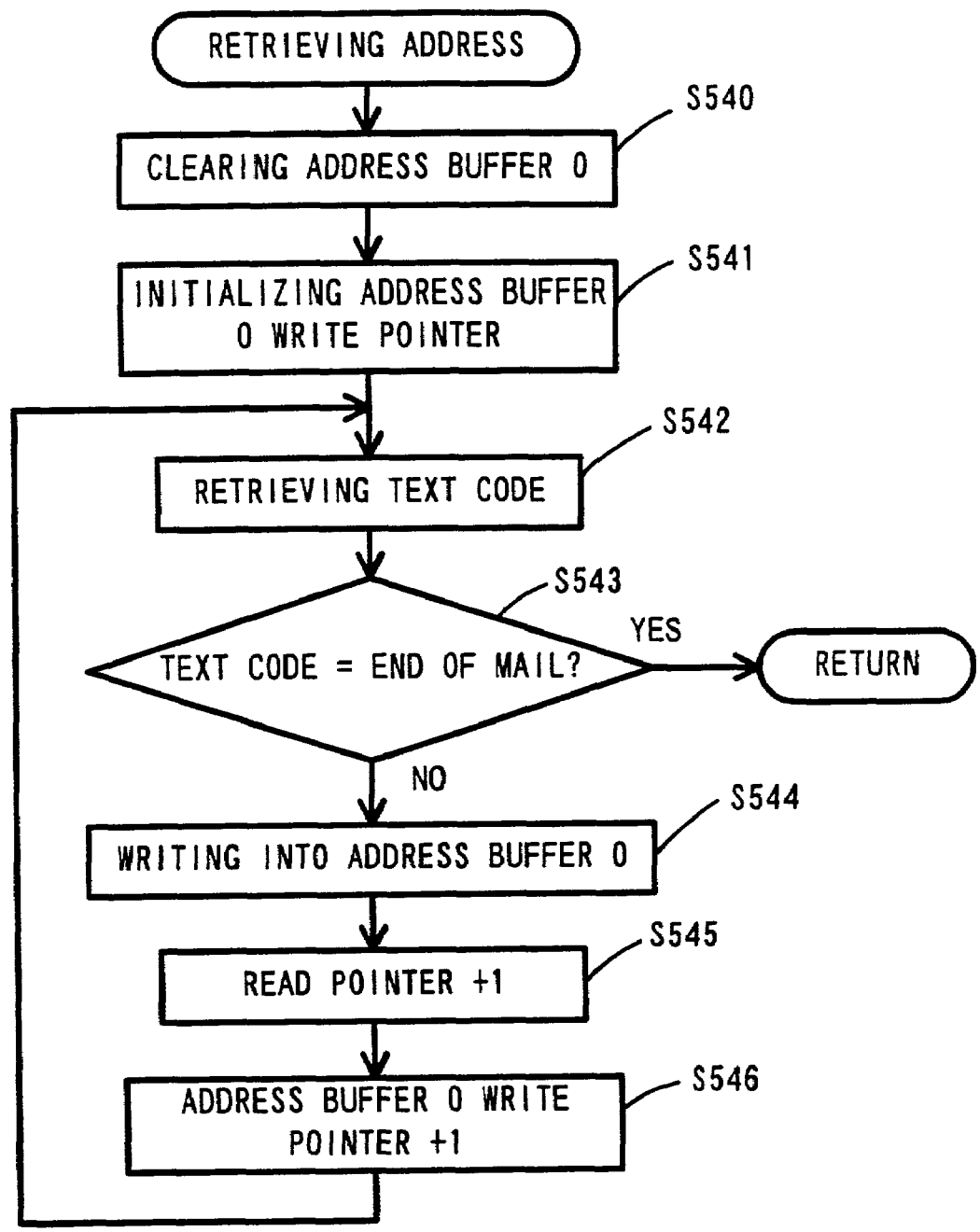
FIG. 10 is a flowchart of an address retrieving subroutine in the e-mail editing process of FIG. 6.
Figure 11:
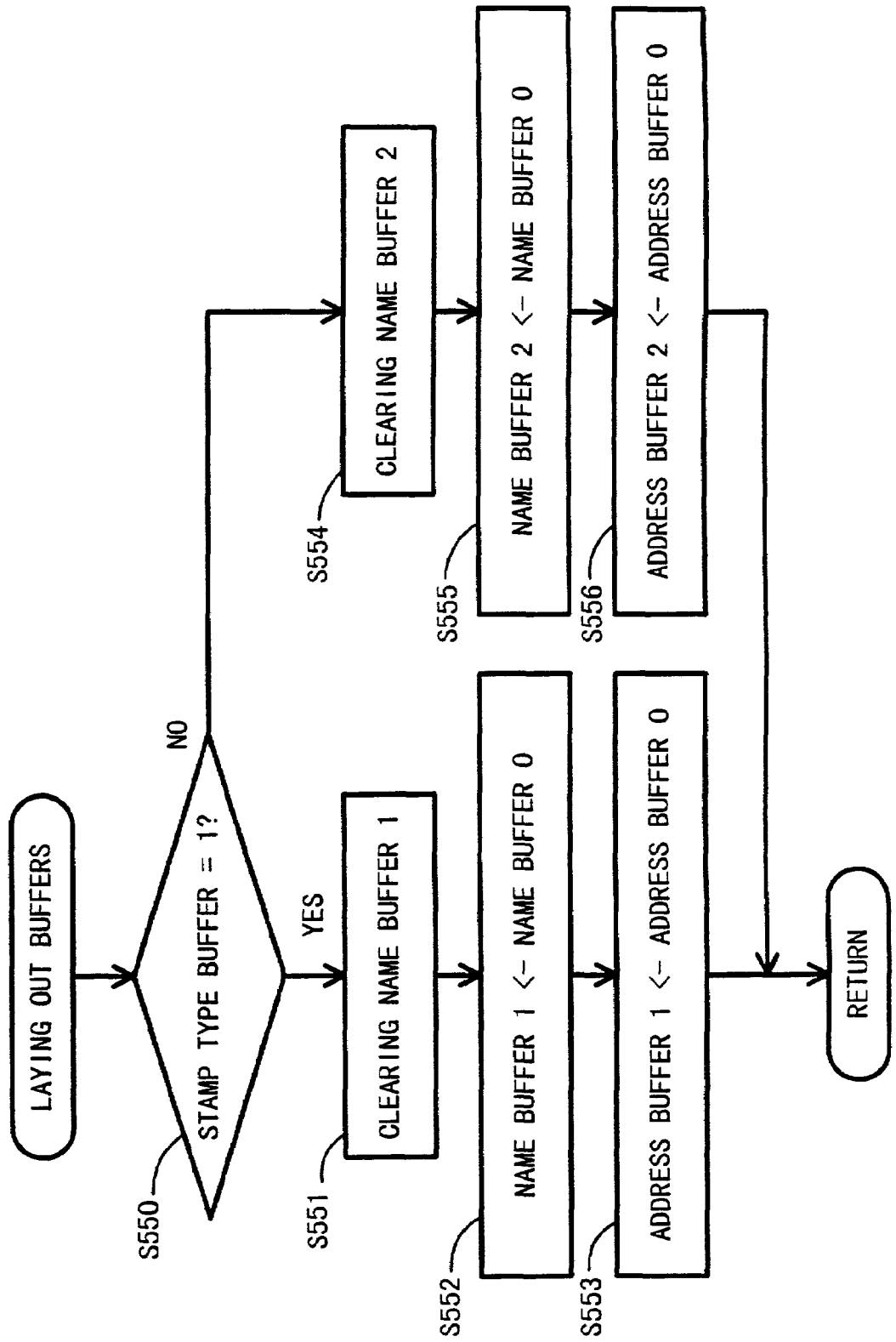
FIG. 11 is a flowchart of a buffer laying-out subroutine in the e-mail editing process of FIG. 6.

Referring to FIGS. 5 through 17, stamp producing steps of the stamp producing system 1, according to the first exemplary embodiment, will be described. FIG. 5 is a main flowchart showing stamp producing steps, according to the first exemplary embodiment. FIG. 6 is a flowchart showing an e-mail editing process in the host computer 18. FIG. 7 is a flowchart showing a stamp type retrieving subroutine in the e-mail editing process of FIG. 6. FIG. 9 is a flowchart showing a name retrieving subroutine in the e-mail editing process of FIG. 6. FIG. 10 is a flowchart showing an address retrieving subroutine in the e-mail editing process of FIG. 6. FIG. 11 is a flowchart showing a buffer laying-out subroutine in the e-mail editing process of FIG. 6.

Figures 13, 14:
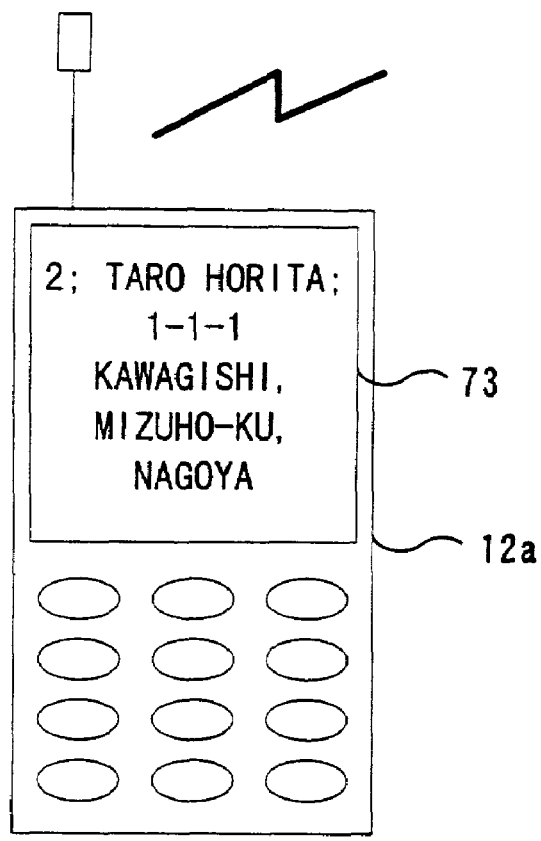
FIG. 13 shows an example of transmission data, displayed on a display of a cellular phone.
FIG. 14 shows an example of a screen of an e-mail editing program, displayed on a display of the host computer for the first exemplary embodiment of the invention.

FIG. 12 shows an example of a brochure that is previously supplied to customers in this exemplary embodiment. FIG. 13 shows an example of transmission data displayed on the display of the cellular phone. FIG. 14 shows an example of a screen of the e-mail editing program displayed on the display of the host computer 18. FIG. 15 shows an example of a difference, in name and address buffer-layouts, between the two types of stamp-face designs. FIG. 16 shows an example of a stamp-face layout produced according to this exemplary embodiment. FIG. 17 is an external perspective view of a stamp produced according to this exemplary embodiment.

In step S1 of FIG. 5, customers 11a-11d use their respective cellular phones 12a-12d to compose e-mail containing text data for an order of a personalized stamp. The e-mail, in this exemplary embodiment, is composed by following a predetermined rule to facilitate editing by the host computer 18. The rule may be to enter a number of text entries by delimiting each entry by a predetermined symbol, for example, a semicolon ";". As shown in FIG. 12, the customers may be notified of such an e-mail composing rule by the previously supplied brochure 101.

In this exemplary embodiment, two text entry items, for example, a name and an address of either the customer who operates the cellular phone or another person are entered into e-mail. These two text entries and a graphic design selected by the customer from two cartoon characters are then engraved into the stamp material. Accordingly, the e-mail composed in this exemplary embodiment contains three entry items: the stamp type, identified by the selected graphic design; entry item 1, for example, a name; and entry item 2, for example, an address.

As shown in FIG. 12, the brochure 101, illustrating the e-mail composing rule, shows: two types of stamp-face graphic designs; an exemplary entry of e-mail; a stamp-face sample that is produced, based on the e-mail; and a telephone number or in an alternative exemplary embodiment, an e-mail address of the e-mail recipient. In this exemplary embodiment, the content of the composed e-mail may be stored in the RAM 63 as code data, and displayed, as shown in FIG. 13, on the display 73 of the cellular phone 12a.

In step S2 of FIG. 5, the customer 11a presses an e-mail transmission button of the cellular phone 12a to transmit the e-mail composed in step S1 to the host computer 18. To transmit e-mail, the cellular phones 12a-12d must be located within a service area covered by the cellular phone service company or the customer's cellular phone service plan must allow for roaming between service areas provided by different cellular phone service companies. During the composition of e-mail in step S1, however, a cellular phone is not required to be located within a cellular phone service company's service area, and a customer may compose e-mail for ordering a stamp on the cellular phone, anytime and anywhere.

In step S3 of FIG. 5, the host computer 18 may directly or indirectly receive the e-mail transmitted from the cellular phones 12a-12d. The received e-mail may be stored in the RAM 83 of the host computer 18. In this exemplary embodiment, each piece of e-mail received by the host computer 18 may include in its header: data representing the e-mail sender's cellular phone number; data representing the stamp type; the name entered as text data; and the address entered as text of data. The host computer 18, if provided with the cellular phone number of an e-mail sender, may perform mail management using the cellular phone number unique to each customer. For example, proper mail management may prevent a wrong stamp from being delivered to a customer. Customer identification information, such as, a cellular phone number may be entered in step S1 by the customer. The customer identification information may also be an e-mail address or a previously registered identification number, instead of the cellular phone number, in various alternative exemplary embodiments.

In step S3 of FIG. 5, e-mail for acknowledging receipt of received e-mail orders or for notifying of the estimated completion time of a stamp may be returned to the cellular phone identified by the customer identification information. The system detecting upon receipt of each piece of e-mail from each of the customers by the e-mail receiver, a number of pieces of e-mail already received and operating conditions of the personalized product producing device, and based on the results of the detection, calculating an estimated time of completion for the requested personalized device, wherein the e-mail returning device returns the piece of e-mail, including an estimated time of completion, to each of the customers. This obviates the need for the customers 11a-11d waiting for the stamp 20 at a delivery site.

In step S4 of FIG. 5, the e-mail editing program of the host computer 18 selects a piece of e-mail to be edited from a list of pieces of e-mail received by the host computer 18, as shown in FIG. 14.

In step S5 of FIG. 5, the piece of e-mail selected in step S4 is processed using the e-mail editing program as described below. In this exemplary embodiment, the e-mail editing process, as shown in FIG. 6, may include five steps: initialization, step S51; retrieval of stamp type, step S52; retrieval of name, step S53; retrieval of address, step S54; and buffer-layout, step S55. These steps will be described with reference to FIGS. 7 through 11.

In the initialization step S51, as shown in FIG. 6, a read-pointer stored in the RAM 83 of the host computer 18 for indicating an e-mail read-point is moved to the beginning of the piece of e-mail to be edited. FIG. 7 shows a flowchart of an initialization subroutine in the e-mail editing process of FIG. 6. In the initialization step S51, control proceeds to step S510, where the read-pointer is moved to the head of the piece of mail. The initialization subroutine then ends and control returns to the initialization step S51.

Figure 8:
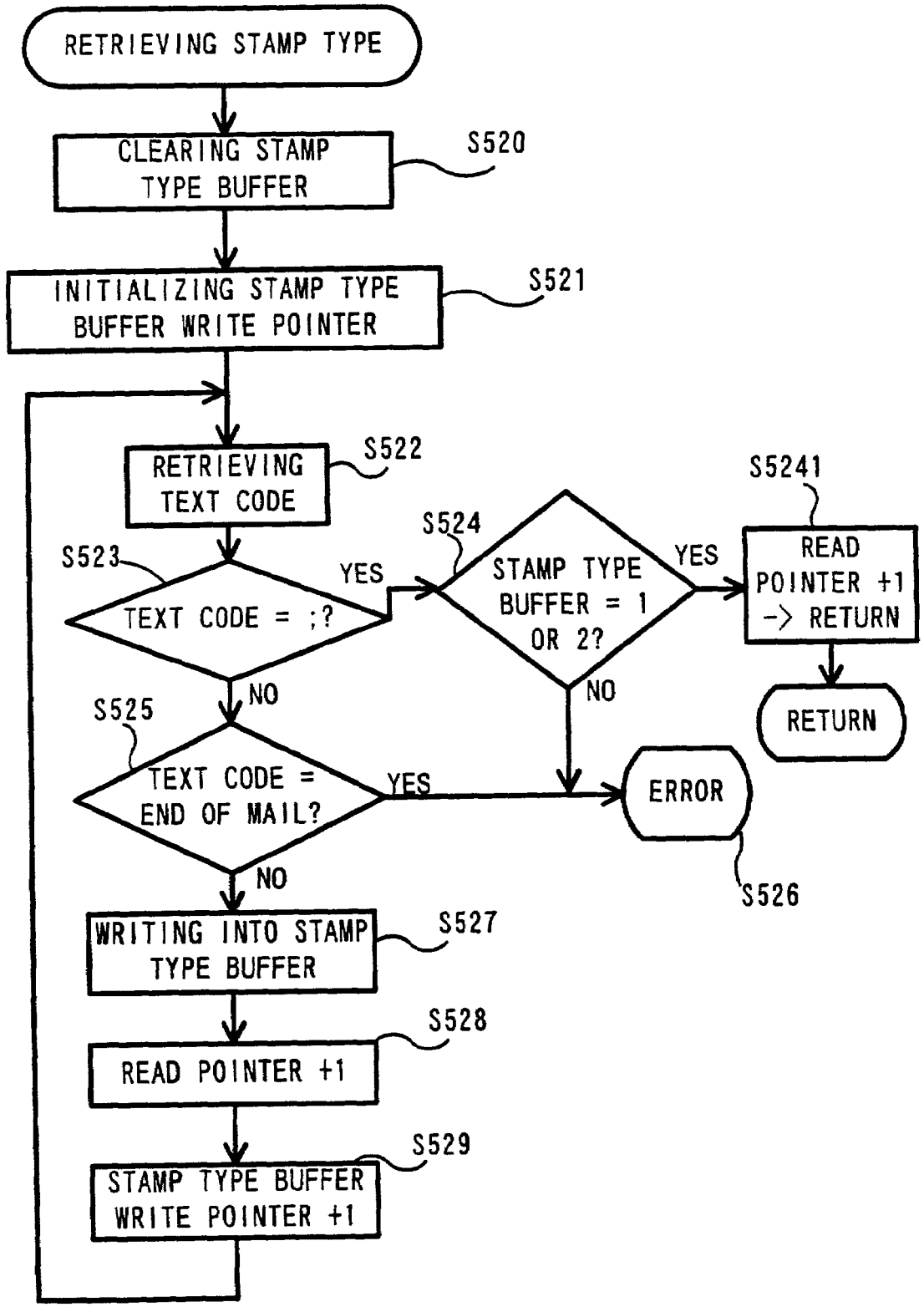
FIG. 8 is a flowchart of a stamp type retrieving subroutine in the e-mail editing process of FIG. 6.

In the stamp type retrieving step S52 of FIG. 6, the contents of the stamp type buffer in the RAM 83 are cleared in step S520, as shown in FIG. 8. Subsequently, in step S521, a stamp type buffer write-pointer for indicating a data write-point in the stamp type buffer is initialized. Then, in step S522, a text code, comprising coded data and located at a point indicated by the read-pointer, is retrieved from the piece of e-mail. In step 523, it is determined whether the text code indicates a delimiting symbol, for example, a semicolon ";", for an entry item.

As shown in FIG. 8, when the text code has a delimiting symbol, as shown in step S523: YES, control goes to step S524 on the assumption that the stamp type data has already been retrieved. In step S524, it is determined whether the data retrieved and stored in the stamp type buffer represents the stamp type, "1" or "2" in this exemplary embodiment. As a result, when the data stored in the stamp type buffer is determined to represent the stamp type, as shown in step S524: YES, control goes to step S524 on the assumption that the data representing the stamp type has been correctly retrieved, the read-pointer is incremented by one, and this subroutine is completed. When the data stored in the stamp type buffer does not to represent the stamp type, as shown in step S524: NO, control goes to step S526, where error handling is performed.

As shown in FIG. 8, when the text code has a delimiting symbol, as shown in step S523: YES, control goes to step S524 on the assumption that the stamp type data has already been retrieved. In step S524, it is determined whether the data retrieved and stored in the stamp type buffer represents the stamp type, "1" or "2" in this exemplary embodiment. As a result, when the data stored in the stamp type buffer is determined to represent the stamp type, as shown in step S524: YES, control goes to step S524 on the assumption that the data representing the stamp type has been correctly retrieved, the read-pointer is incremented by one, and this subroutine is completed. When the data stored in the stamp type buffer does not to represent the stamp type, as shown in step S524: NO, control goes to step S526, where error handling is performed.

As shown in FIG. 8, when the text code has no delimiting symbol, as shown in step S523: NO, control goes to step S525 on the assumption that the stamp type has not yet been retrieved. In step S525, it is determined whether the text code retrieved in step S522 is a code attached to and indicative of the end of the body of the piece of e-mail or whether retrieval of the text code failed in step S522. When the text code is a code for the end of the body of the piece of e-mail, as shown in step S525: YES, control goes to step S526, where error handling is performed.

In step S527, when the text code is not a code for the end of the body of the piece of e-mail, as shown in step S525: NO, the text code retrieved in step S522 is written into the stamp type buffer. Then, in step 5528, the read-pointer is incremented by one and, in step S529, the stamp type buffer write-pointer is also incremented by one. Subsequently, control returns to step S522. By iterating these steps, the text code representing the stamp type, for example, "1" or "2" in this exemplary embodiment, is written into the stamp type buffer in the RAM 83 of the host computer 18.

In the name retrieving step S53 of FIG. 6, the content of a name buffer, for example, name buffer 0, in the RAM 83 is cleared in step S530, as shown in FIG. 9. In step S531, the name buffer 0 write-pointer for indicating a data writepoint in the name buffer 0 is then initialized. In step S532, a text code, included in the coded data and located at a point indicated by the read-pointer, is retrieved from the body of the piece of e-mail. It is then determined, in step 533, whether the text code is a delimiting symbol, for example, a semicolon ";" for a test entry item.

When the text code is a delimiting symbol, as shown in step S533: YES, control goes to step S534 on the assumption that the name data has already been retrieved. In step S534, the read-pointer is incremented by one and this subroutine is completed. However, when the text code is not a delimiting symbol, as shown in step S533: NO, control goes to step S535 on the assumption that the name data has not yet been retrieved. In step S535, it is determined whether the text code, retrieved in step S532, is attached to and indicative of the end of the body of the piece of e-mail or whether retrieval of the text code failed in step S532. When the text code is a code indicative of the end of the body of the piece of e-mail, as in step S535: YES, control goes to step S536, where error handling is performed.

When the text code is not a code indicative of the end of the body of the piece of e-mail, as shown in step S535: NO, the text code retrieved in step S532 is written into the name buffer 0 in step S537. In step S538, the read-pointer is then incremented by one and, in step S539, the name buffer 0 write-pointer is also incremented by one. Subsequently, control returns to step S532. By iterating these steps, text data representing the name entered by the customer is written into the name buffer 0 in the RAM 83 of the host computer 18.

In the address retrieving step S54 of FIG. 6, the content of an address buffer, for example, address buffer 0, in the RAM 83, is cleared in step S540, as shown in FIG. 10. In step S541, a write-pointer for indicating a data write-point in the address buffer 0 is then initialized. In step S542, text code at a point indicated by the read-pointer is retrieved from the body of the piece of e-mail. It is then determined, in step S543, whether the text code is attached to and indicative of the end of the body of the piece of e-mail or whether retrieval of a text code failed in step S542. When the text code is a code indicative of the end of the body of the piece of e-mail, as in step S543: YES, this subroutine is completed on the assumption that the address data has already been retrieved.

In step S544, when the text code is not a code indicative of the end of the body of the piece of e-mail, as shown in step S543: NO, the text code retrieved in step S542 is written into the address buffer 0. In step S545, the read-pointer is incremented by one and, in step S546, the address buffer 0 write-pointer is also incremented by one. Subsequently, control returns to step S542. By iterating these steps, text data representing the address entered by the customer is written into the address buffer 0 in the RAM 83 of the host computer 18.

In the buffer laying-out step S55 of FIG. 6, it is determined whether "1" or "2" is written in the stamp type buffer in the RAM 83 of the host computer 18. When the stamp type is determined to be "1", as shown in step S550: YES of FIG. 11, a name buffer, for example, name buffer 1, and an address buffer, for example, address buffer 1, in the RAM 83 are cleared in step S551, and then the contents of the name buffer 0 are written into the name buffer 1 in step S552, and the contents of the address buffer 0 are written into the address buffer 1 in step S553. However, when the stamp type is determined to be "2", as in step S550: NO, the name buffer 2 and the address buffer 2 in the RAM 83 are cleared in step S554, and then the contents of the name buffer 0 are then written into the name buffer 2 in step S555, and the contents of the address buffer 0 are written into the address buffer 2 in step S556. In this way, the buffers are laid-out and the e-mail editing step is completed.

Two name buffers and two address buffers are used in this exemplary embodiment, because the engraved name and address positions within the stamp-face area are different, as shown in FIG. 15, depending on whether the stamp type is "1" or "2". With stamp type "1", a cartoon character is engraved near the left edge of the stamp-face area and the name and the address are located a predetermined distance from the left edge. On the other hand, with stamp type "2", a cartoon character is engraved near the right edge of the stamp-face area and the name and the address are located a predetermined distance from the right edge.

After the completion of the e-mail editing, control goes back to step S6 of FIG. 5, where the e-mail data edited in step S5 is supplied to the stamp producing device 19. More specifically, the contents of the stamp type buffer, the contents of the name buffer 1 or 2, whichever has been updated more recently, and the contents of the address buffer 1 or 2, whichever has been updated more recently, are transmitted to the stamp producing device 19, as the stamp producing data.

In various exemplary embodiments, the stamp producing device 19 receives the stamp producing data from the host computer 18 and stores it in the RAM 93 of the stamp producing device. Alternatively, the stamp producing data may be stored in any other memory location within the system and retrieved when needed by the stamp producing device. The CPU 91 generates dot matrix or vector data for engraving the stamp-face by referring to data for the letters and data for a graphic design, for example, a cartoon character, stored in the ROM 92, and based on the stamp producing data stored in the RAM 93. The CPU 91 then stores the dot matrix data in the image buffer of the RAM 93. The stamp 20, as shown in FIG. 17, having the engraved stamp-face shown in FIG. 16, is produced by the stamp producing device 19, based on the dot matrix data.

In various exemplary embodiments, the stamp 20 is provided to the customer for cash on delivery, as shown in step S7 of FIG. 5. In this example, the customer's cellular phone number is checked to avoid a mismatch between the stamp ordered by the customer and the stamp to be delivered. The stamp providing system 1, in this embodiment, is provided with an automatic delivery device for the produced stamps. For example, an automatic delivery device may eject, in response to payment by the customer of a prescribed stamp fee and an entry of the customer's cellular phone number, a stamp associated with the entered cellular phone number. Use of such an automatic delivery device may, for example, prevent a shop attendant from delivering the wrong stamp to the customer due to a mistake in checking the cellular phone number. The customer may go to the installation site of the stamp producing device 19 to get the stamp 20, or may have the stamp 20 sent by mail or courier to his or her home.

As described above, according to the first exemplary embodiment, when the customers 11a-11d want to order the personalized stamp 20 having a particular stamp-face, all they have to do is send the ordering data by the cellular phones 12a-12d. Instead of going to the site of the stamp producing device 19 and entering the ordering data for the personalized stamp or filling out an order form, the customer may quickly and efficiently order a personalized stamp using his or her cellular phone. Also, automatically producing the stamps, based on the stamp producing data transmitted from the customers 11a-11d, saves the stamp producer the effort of entering the data from the order form and enables the stamp producer to receive orders from customers who are far from stamp producing sites.

In this exemplary embodiment, because the stamp producing data is generated and transmitted by cellular phones 12a-12d, the customers 11a-11d may also order a personalized stamp from various locations and at their convenience.

In this exemplary embodiment, because a number of cellular phones 12a-12d may be identified by using their cellular phone numbers, a sender's cellular phone may also be easily identified from the ordering data received. Additionally, personalized stamps may be produced, using personal information, such as the name and the address of the customers 11a-11d or any other text information the customer wishes to have engraved on the personalized stamp-face.

Although, in this exemplary embodiment, the stamp type together with the name and the address are sent by e-mail to the host computer 18, alternative embodiments may only send the name and the address by e-mail to the host computer 18. The stamp type would then be designated later, when a customer goes to a site where stamp designs are shown. Such an alternative embodiment would be effective when stamp design samples are not previously printed in a brochure 101, as shown in FIG. 12, due to, for example, frequent stamp design changes. Prior transmission of all the data necessary for producing a personalized stamp from a cellular phone, as shown in this exemplary embodiment, allows a customer to get a stamp, quickly and conveniently.

Figure 18:
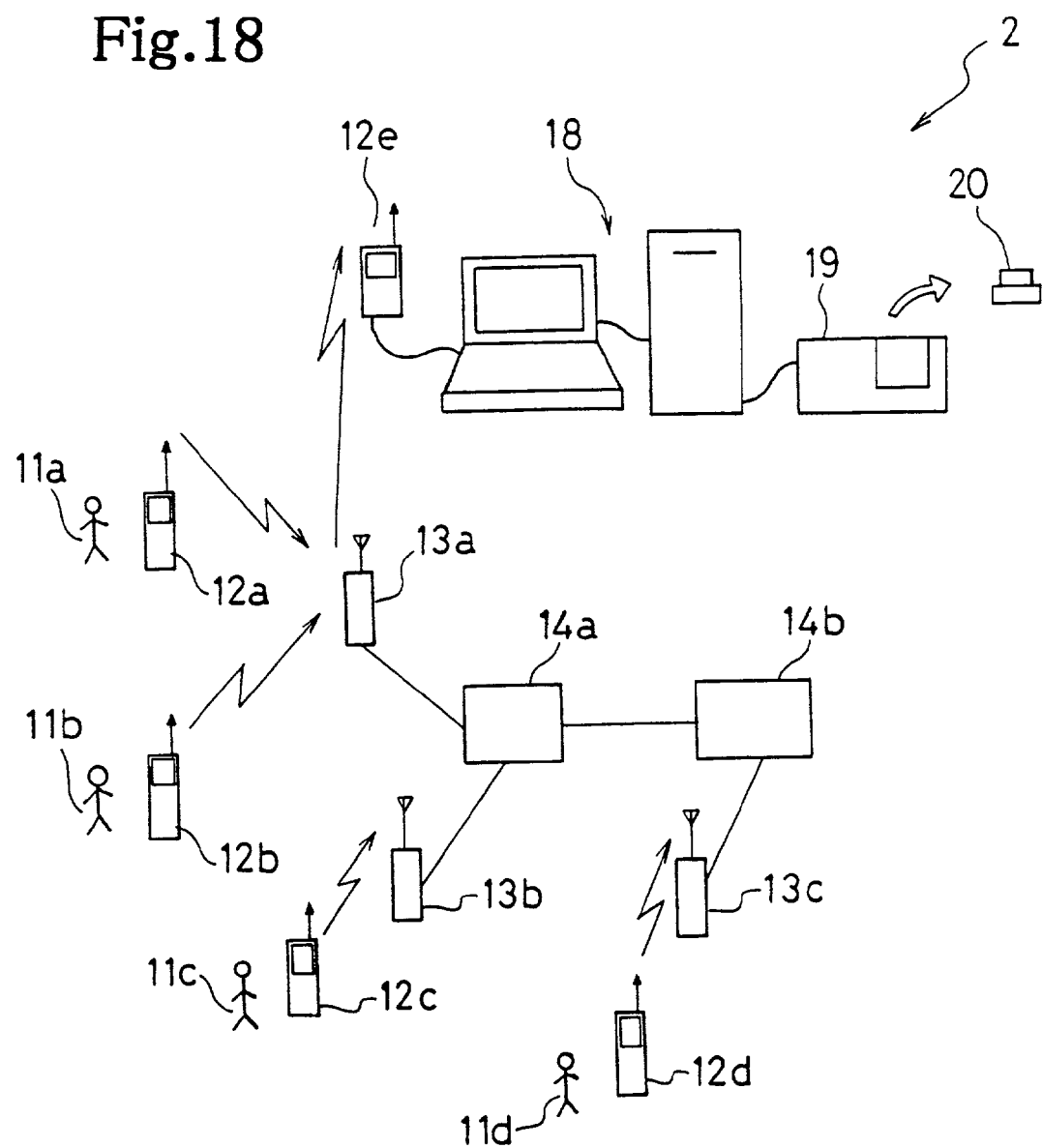
FIG. 18 is a schematic diagram, showing a configuration of a stamp producing system, according to a second exemplary embodiment of the invention.

A stamp producing system according to a second exemplary embodiment of the invention will now be described with reference to the schematic diagram of FIG. 18. In this exemplary embodiment, a cellular phone connected to a host computer is used as a data receiver and eliminates the use of the public line and the modem used in the first exemplary embodiment. In stamp producing system 2, according to the second exemplary embodiment and as shown in FIG. 18, a personalized stamp 20 is produced from a thermoplastic porous material by a stamp producing device 19 at a distance from a number of customers (only four customers 11a-11d are shown here by way of example), based on stamp producing data transmitted from their respective cellular phones 12a-12d.

In various exemplary embodiments, text data for a personalized stamp is sent from the cellular phones 12a-12d in the form of e-mail to a cellular phone 12e connected to the host computer 18. More specifically, text data sent from the cellular phones 12a, 12b is sent from a base station 13a of a cellular phone service company to the cellular phone 12e located within a territory of the base station 13a. Alternatively, text data sent from the cellular phone 12c may be sent from a base station 13b, via a cellular phone switching station 14a and the base station 13a, to the cellular phone 12e. In another exemplary embodiment, text data sent over the air from the cellular phone 12d may be sent from a base station 13c, via a cellular phone switching station 14b, to another cellular phone switching station 14a, the base station 13a, and thence to the cellular phone 12e. In this exemplary embodiment, a cellular phone connection adapter 89, instead of the modem 17, may be connected to the I/O interface 84, as shown in FIG. 4.

In this second exemplary embodiment, the e-mail received by the cellular phone 12e is stored in its RAM 63 and retrieved by the host computer 18, using an e-mail retrieving program stored in the cellular phone 12e. The e-mail is then stored in RAM 83 of the host computer. Subsequently, the stamp 20 is produced according to the same steps as in the first exemplary embodiment and provided to the customer.

In this exemplary embodiment, using a wireless receiver, for example, a cellular phone, as the data receiver, allows the host computer 18 and the stamp producing device 19 to be installed in locations within the cellular phone service area, where connection with a public line is difficult or impossible. Accordingly, the installation sites of the host computer 18 and the stamp producing device 19 may be more easily selected and the installation site for the host computer 18, receiving the data may be built at a lower cost.

Figure 19:
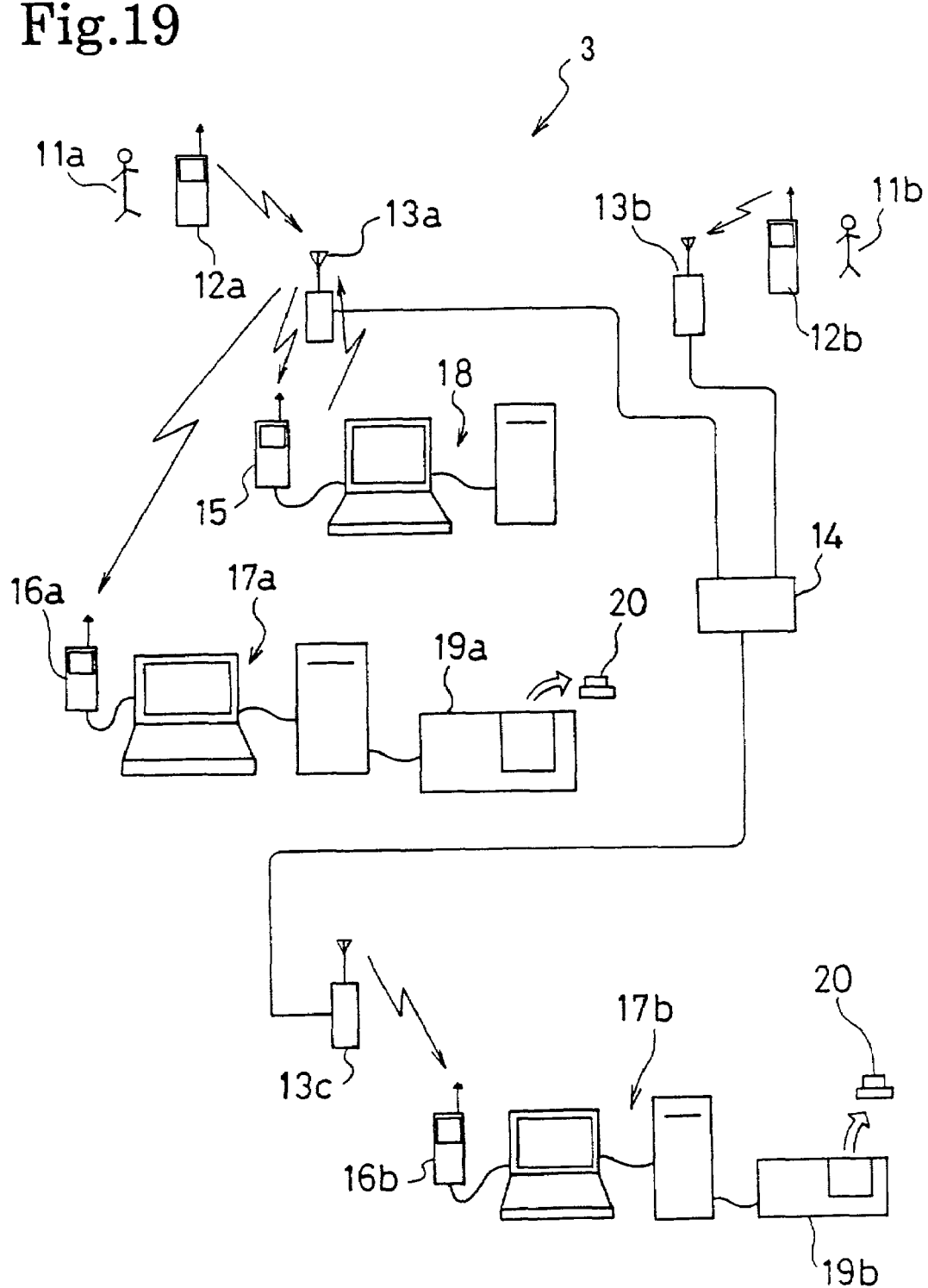
FIG. 19 is a schematic diagram, showing a configuration of a stamp producing system, according to a third exemplary embodiment of the invention.

A stamp providing system according to a third exemplary embodiment of the invention will now be described with reference to the schematic block diagram of FIG. 19. In this third exemplary embodiment, a stamp producing device 19a or 19b, produces a stamp 20, based on stamp producing data, transmitted over the air from, for example, cellular phones 12a, 12b, which are portable wireless data receivers/transmitters operated by the respective customers 11a, 11b.

In this third exemplary embodiment, stamp producing data sent from the cellular phones 12a, 12b is sent to a host computer 18 in the form of e-mail. As will be described later, the text data contains data to be engraved on a stamp material of the stamp 20, as well as data designating a stamp production site. When, for example, e-mail is transmitted over the air as digital or analog signals from the cellular phone 12a, which is located within a territory of a base station 13a shared by the host computer 18, the e-mail is received, via the base station 13a by the cellular phone 15 connected to the host computer 18. On the other hand, when the e-mail is transmitted over the air as digital or analog signals from the cellular phone 12b, which is located within a territory of a base station 13b not shared by the host computer 18, the e-mail is received by the cellular phone 15 via the base station 13b, a cellular phone switching station 14, and the base station 13a.

In this third exemplary embodiment, the host computer 18, as will be described in detail below, transfers the received e-mail from the cellular phone 15, based on its content to one of a plurality of cellular phones. Only two cellular phones 16a, 16b are shown in this exemplary embodiment. The stamp producing devices 19a, 19b are connected to the cellular phones 16a, 16b, via output terminals 17a, 17b, respectively. The output terminals 17a, 17b, as will be described in detail below, edit stamp-face data based on the content of the received e-mail. The edited data is then sent to either the stamp producing device 19a or 19b. The stamp producing device 19a or 19b, as described below, optically engraves an image on the stamp material, based on the data sent from either the output terminal 17a or 17b, and produces the stamp 20 having the ordered stamp-face.

In the third exemplary embodiment, the cellular phones 16a, 16b constitute data receivers, and the output terminals 17a, 17b and the stamp producing devices 19a, 19b constitute personalized product producing devices.

Referring to the block diagram of FIG. 20, a control system of the stamp providing system 3 according to the third exemplary embodiment, will be described. In FIG. 20, only one cellular phone, for example, cellular phone 12a, one output terminal, for example, output terminal 17a, and one stamp producing device, for example, stamp producing device 19a, of a number of cellular phones, output terminals, and stamp producing devices, usable by the stamp providing system 3 according to this exemplary embodiment, are representatively shown. Base stations and switching stations are omitted from FIG. 20. Elements structurally similar to those of the first exemplary embodiment have the same reference numbers and a detailed description thereof will be omitted.

The components of each part of the third exemplary embodiment are similar to those in the first exemplary embodiment. As shown in FIG. 20, the cellular phone 12a has a CPU 61, a ROM 62, a RAM 63, a DSP 64, a wireless unit controller 65, and an I/O interface 66, and these components are connected to each other using a bus 67.

In this third exemplary embodiment, the output terminal 17a may have a CPU 81, a ROM 82, a RAM 83 and an I/O interface 84, and these components are connected to each other using a bus 85. Connected to the I/O interface 84 may be a hard disk 86, a keyboard 87, a display 88, and a cellular phone connection adapter 89. For example, the cellular phone 16a is connected to the cellular phone connection adapter 89 so as to enable data reception/transmission by or from the output terminal 17a via the base station 13a.

The hard disk 86 may magnetically or optically store a program for loading e-mail from, for example, the cellular phone 16a and a program for editing e-mail also received from the cellular phone 16a, a program for exchanging data with the stamp producing device 19a, and other programs used for operation of the stamp producing systems. The RAM 83 may store temporarily programs read from the hard disk 86, received e-mail, and data entered from the keyboard 87 or other data input devices. The RAM 83, as will be described below, is provided with name buffers 0-2, address buffers 0-2, a stamp type buffer, a delivery point buffer, and a memory area for various pointers.

Because the hardware configuration of the host computer 18, to which the cellular phone 15 is connected, is substantially the same as that of the above-described output terminal 17a, a detailed description thereof is omitted. The host computer 18 may store, in addition to an e-mail loading program, a program for unloading e-mail to the cellular phone 15 for subsequent e-mail transmission and may also store, as will be described below, an e-mail transfer program, instead of the e-mail editing program of the exemplary embodiments, described above.

In this third exemplary embodiment, the stamp producing device 19a may be provided with a CPU 91, a ROM 92, a RAM 93, and an I/O interface 94, and these components may be connected to each other using a bus 95. The I/O interface 94 may connect to the I/O interface 84 of the output terminal 17a via a cable or any other means of electronic communication. This allows the stamp producing device 19a to retrieve stamp-face data edited according to this exemplary embodiment from the output terminal 17a.

The ROM 92 may store a control program for controlling the entire operation of the stamp producing device 19a. The RAM 93 may store stamp producing data provided from the output terminal 17a. The RAM 93 may contain an image buffer for storing dot matrix or vector data, based on the stamp producing data.

Figure 21:
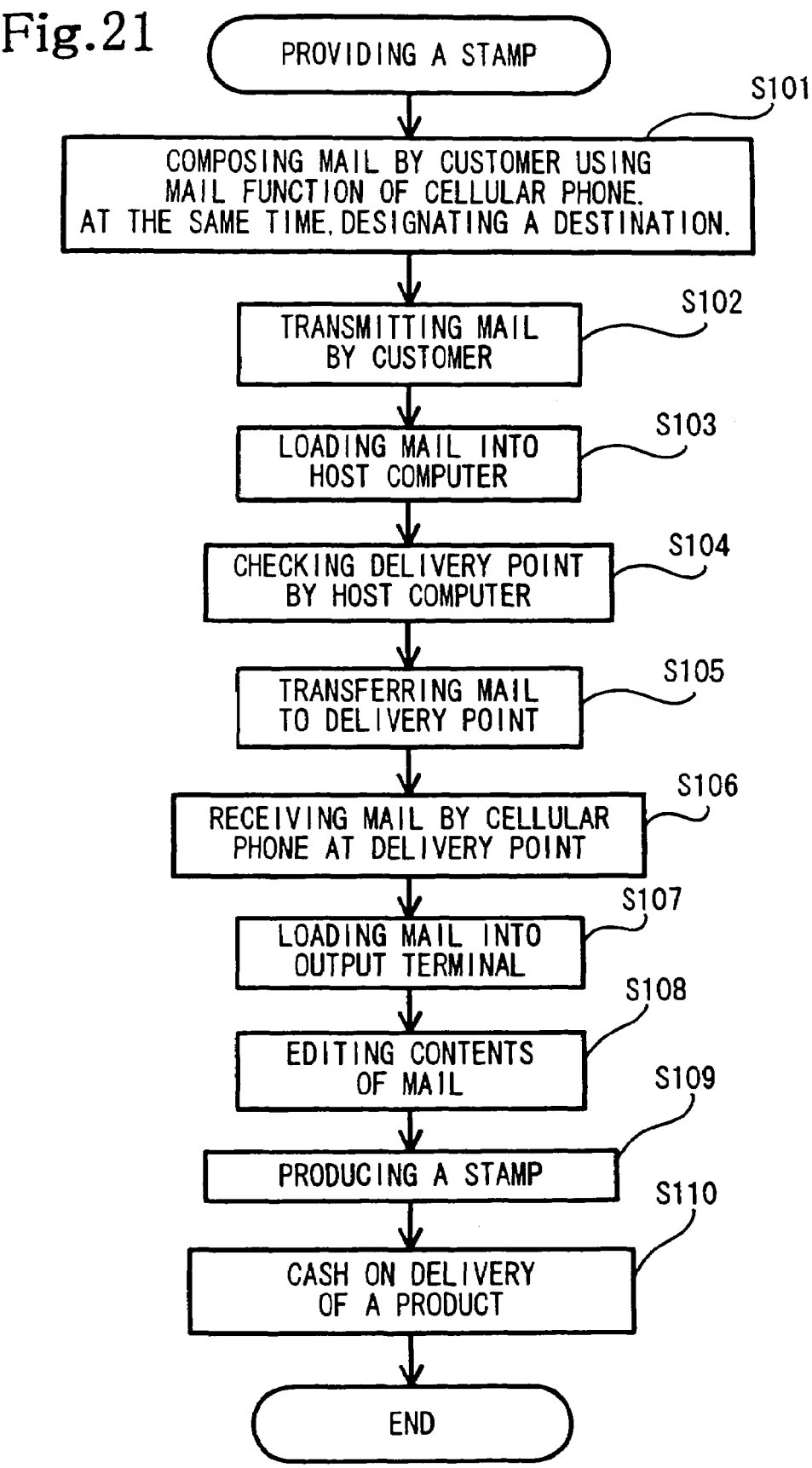
FIG. 21 is a main flowchart, showing stamp producing steps, in the third exemplary embodiment of the invention.
Figure 22:
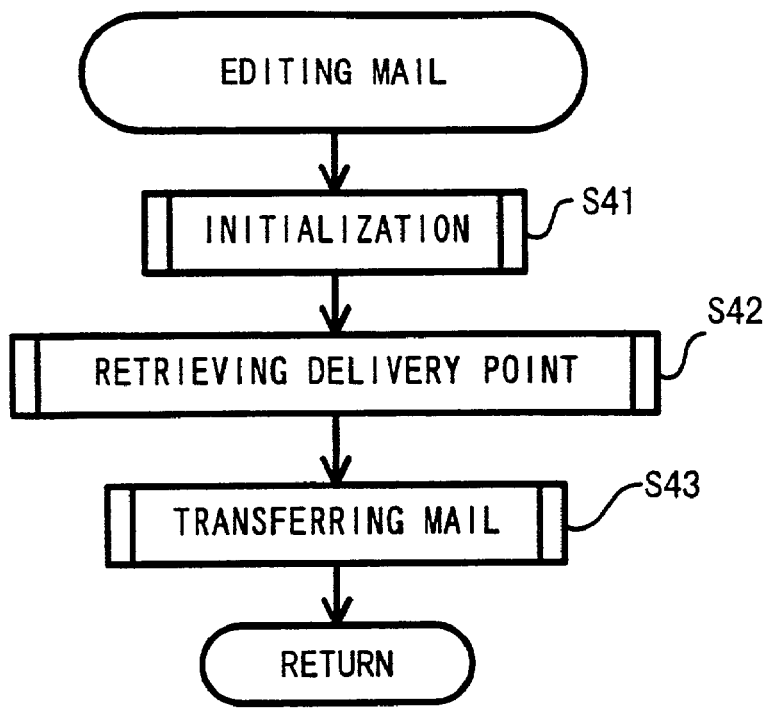
FIG. 22 is a flowchart, showing the e-mail transfer process of FIG. 21 executed by a host computer.
Figure 23:
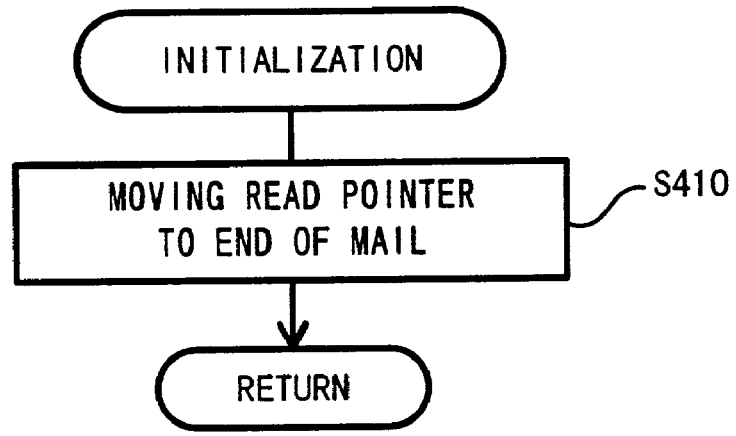
FIG. 23 is a flowchart, showing the initialization subroutine of the e-mail transfer process of FIG. 22.
Figure 24:
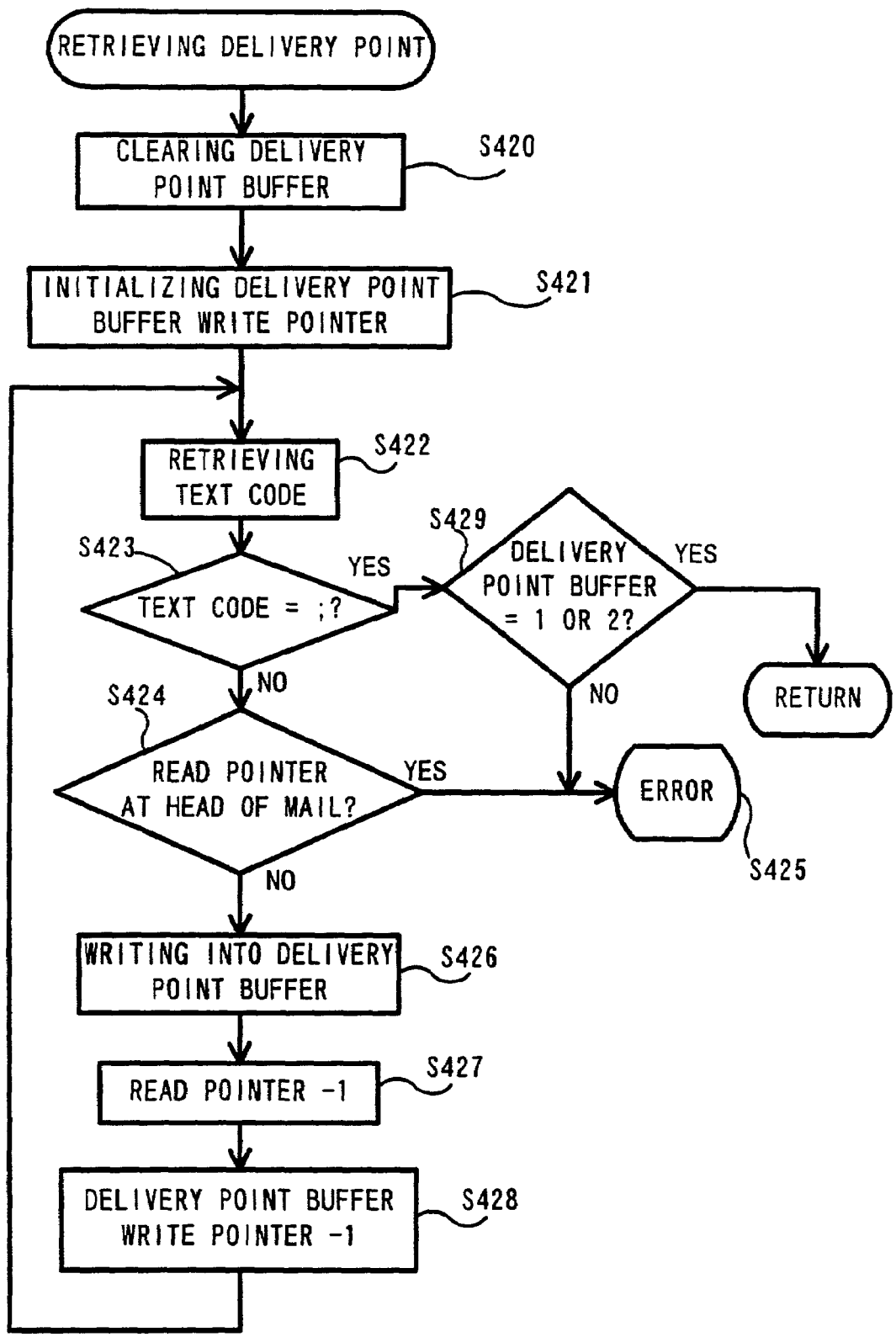
FIG. 24 is a flowchart, showing the delivery point retrieving subroutine of the e-mail transfer process of FIG. 22.
Figure 25:
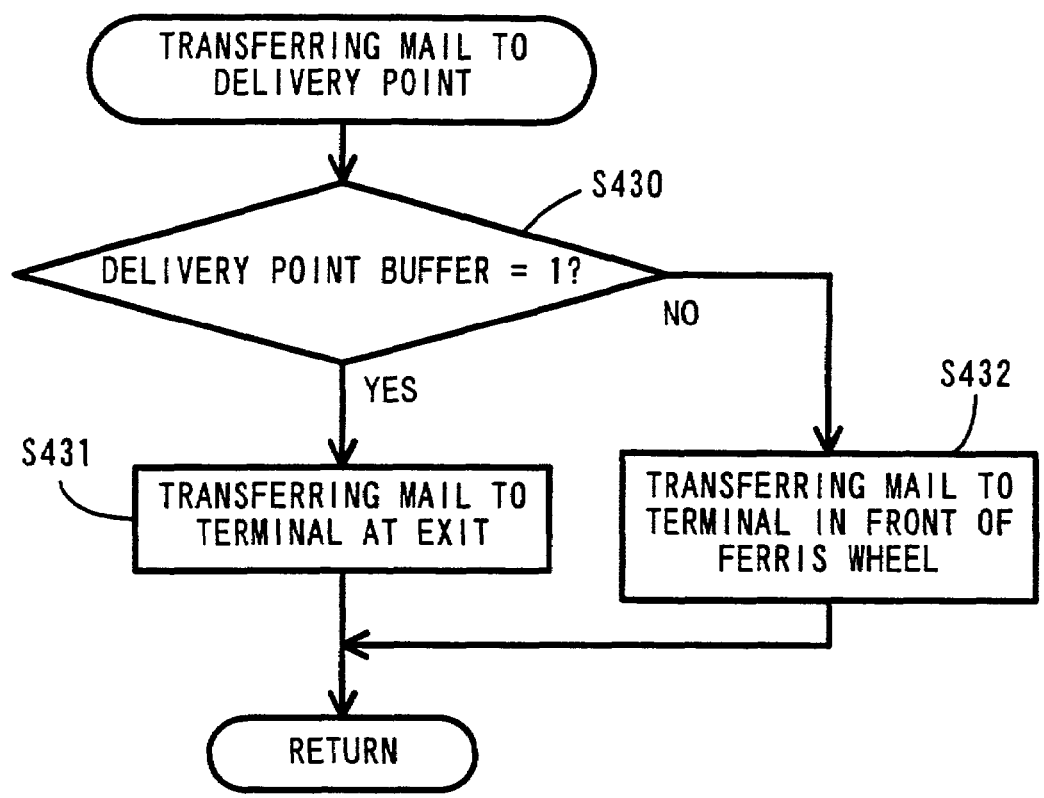
FIG. 25 is a flowchart, showing the e-mail transfer subroutine of the e-mail transfer process of FIG. 22.

Referring to FIGS. 21 through 32, stamp producing steps in the stamp producing system 3, according to the third exemplary embodiment will be described. FIG. 21 is a main flowchart showing stamp producing steps, according to the third exemplary embodiment. FIG. 22 is a flowchart showing an e-mail transfer process in the host computer 18. FIG. 23 is a flowchart showing an initialization subroutine in the e-mail transfer process of FIG. 22. FIG. 24 is a flowchart showing a delivery point retrieving subroutine in the e-mail transfer process of FIG. 22. FIG. 25 is a flowchart showing an e-mail transfer subroutine in the e-mail transfer process of FIG. 22.

Figure 26:
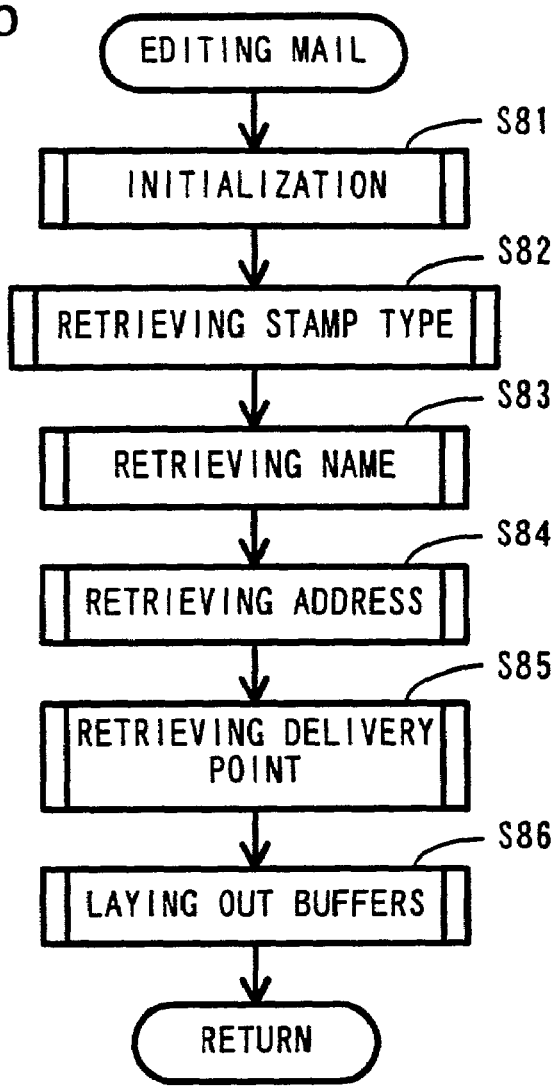
FIG. 26 is a flowchart, showing the e-mail editing process of FIG. 21 executed by an output terminal.
Figure 27:
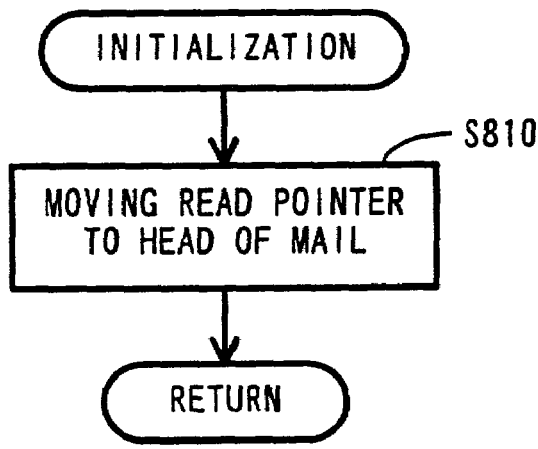
FIG. 27 is a flowchart of the initialization subroutine in the e-mail editing process of FIG. 26.
Figure 28:
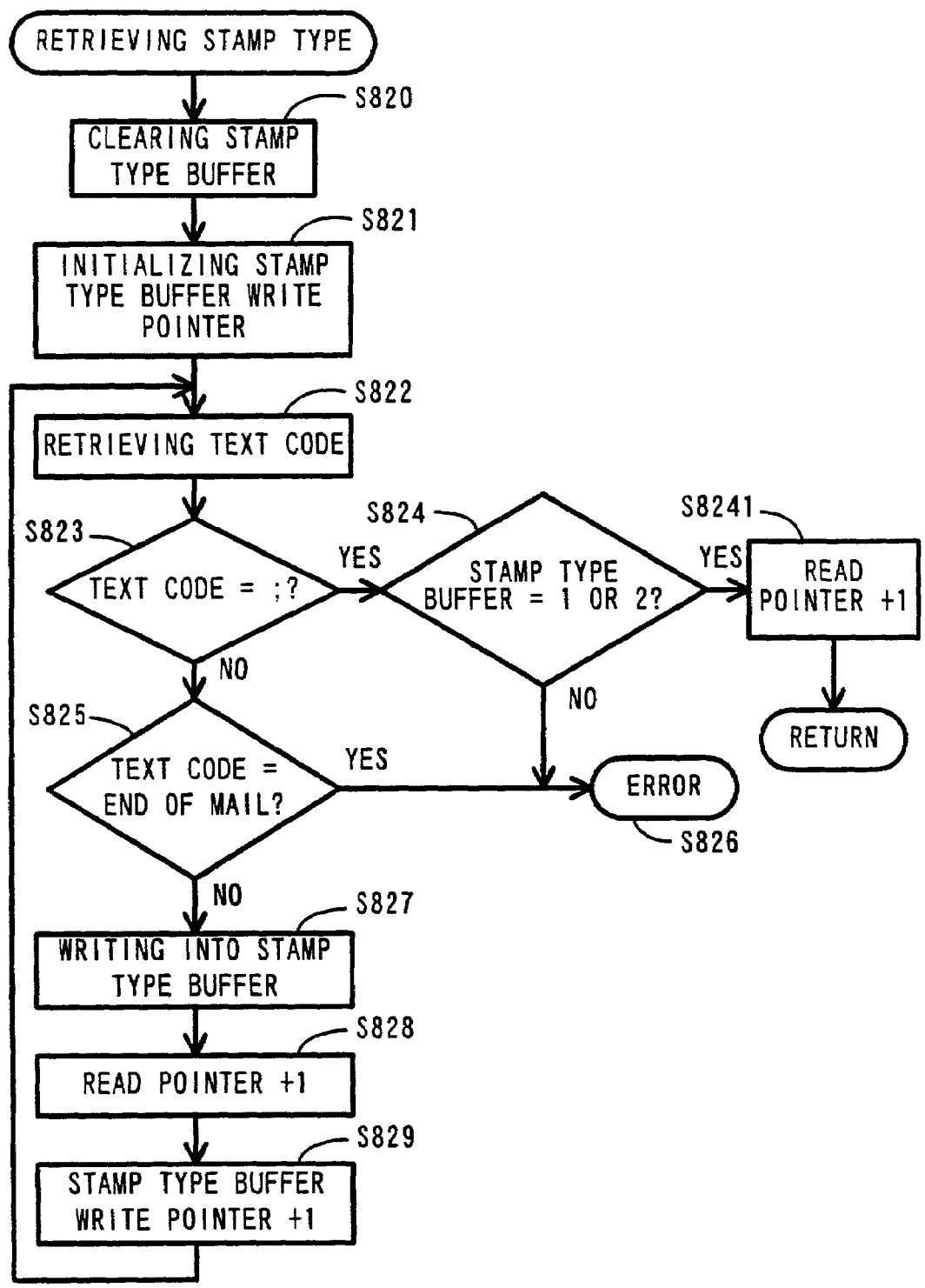
FIG. 28 is a flowchart of the stamp type retrieving subroutine of the e-mail editing process of FIG. 26.
Figure 29:
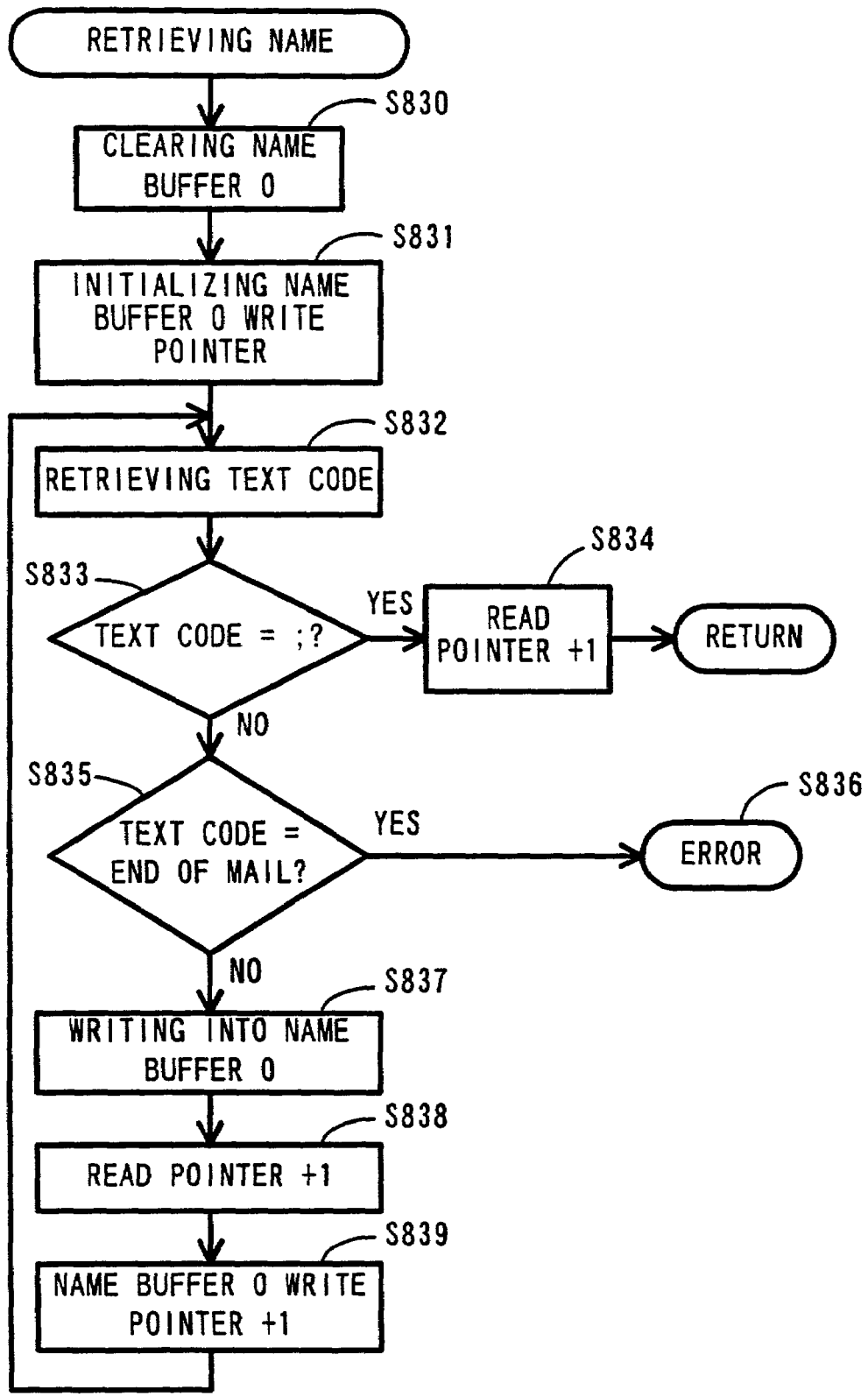
FIG. 29 is a flowchart of the name retrieving subroutine of the e-mail editing process of FIG. 26.
Figure 30:
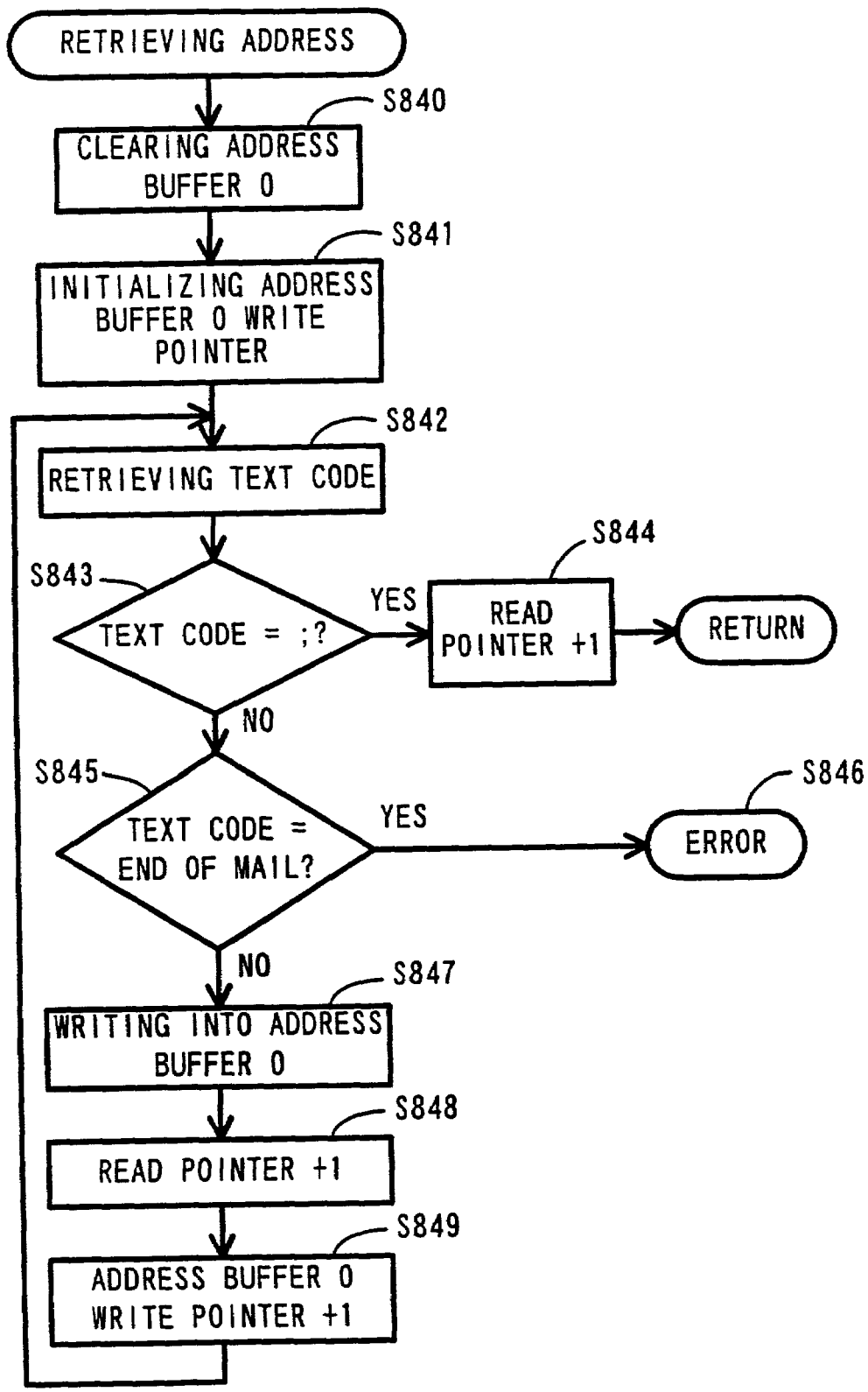
FIG. 30 is a flowchart of the address retrieving subroutine of the e-mail editing process of FIG. 26.
Figure 31:
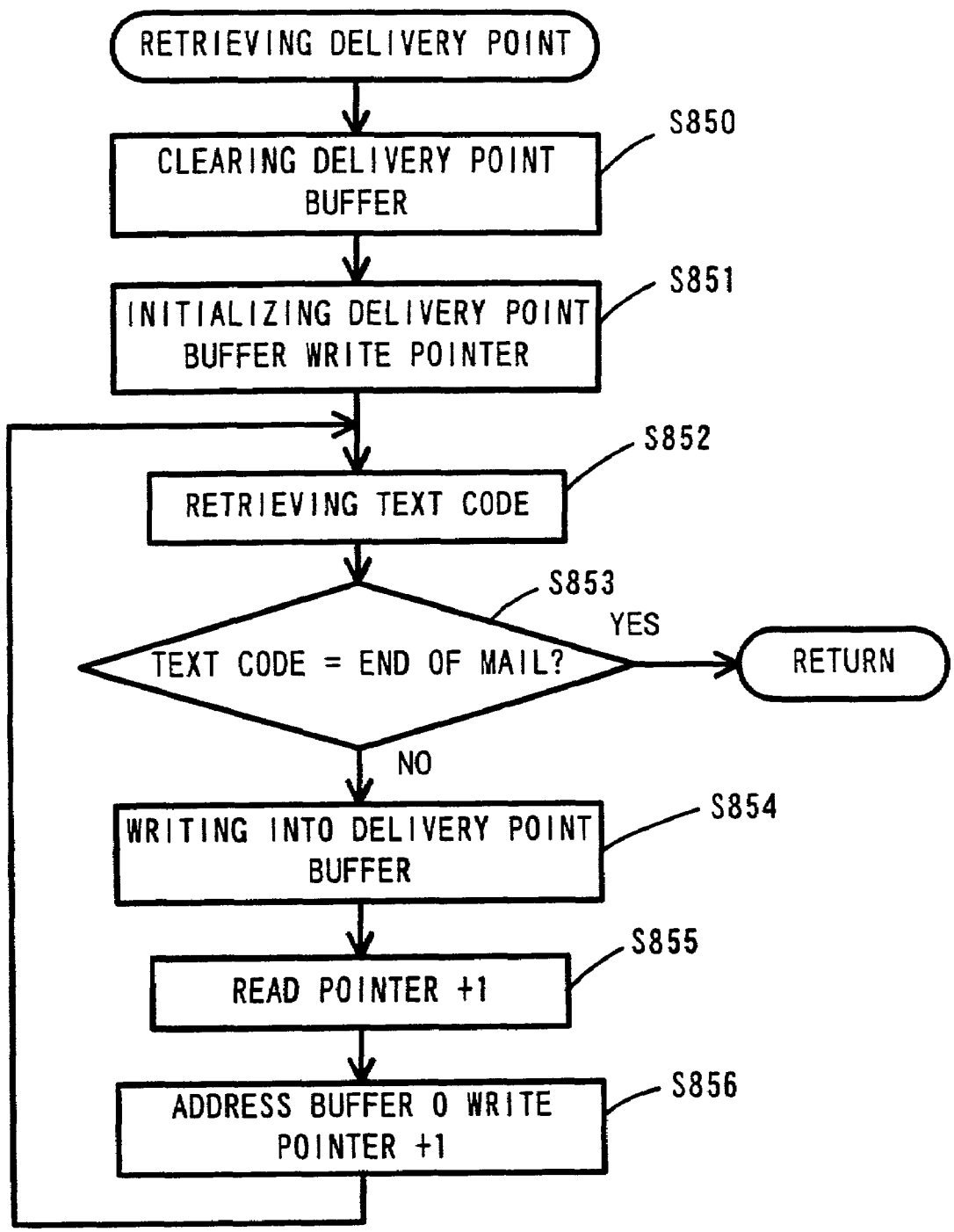
FIG. 31 is a flowchart of the delivery point retrieving subroutine of the e-mail editing process of FIG. 26.
Figure 32:
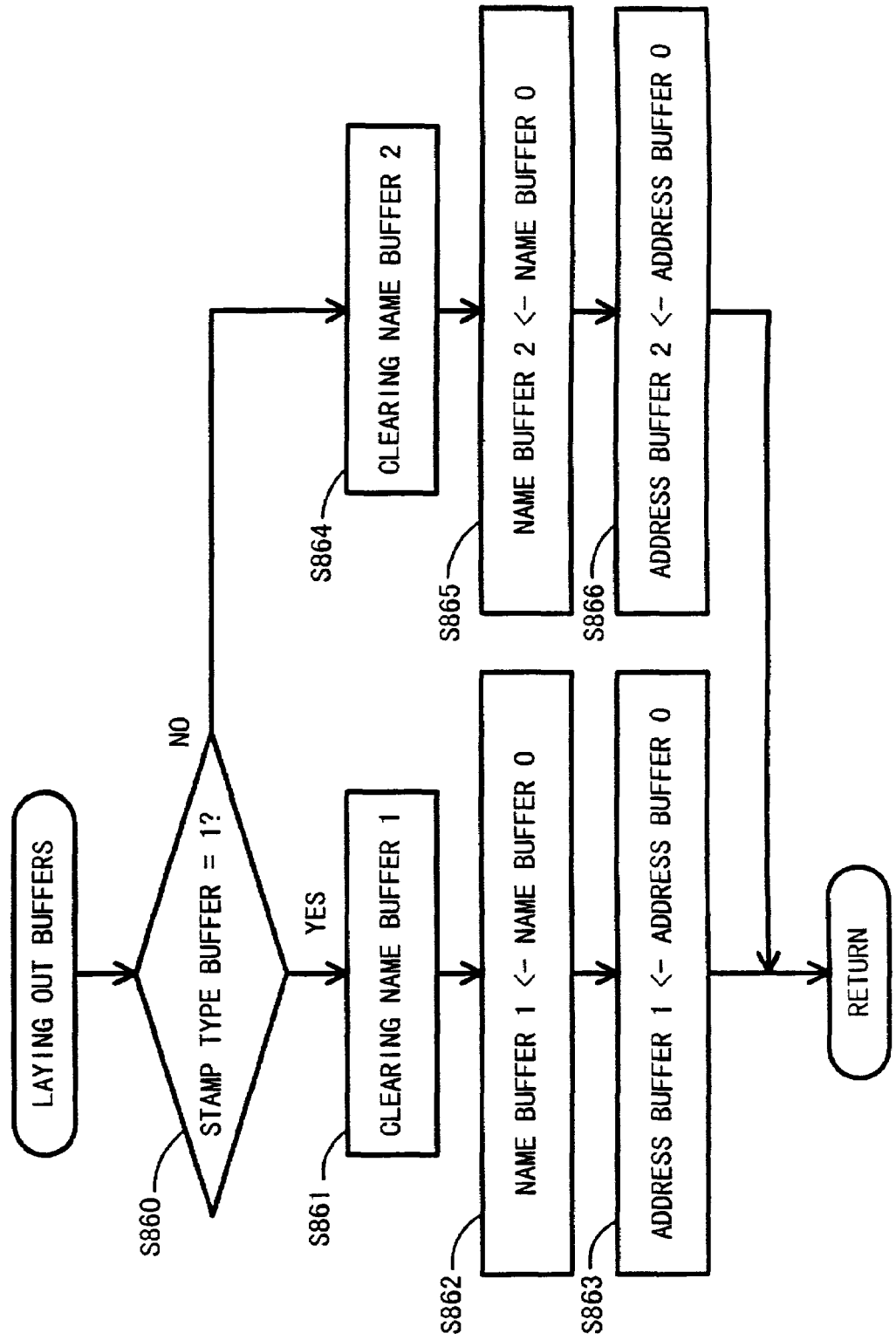
FIG. 32 is a flowchart of the buffer laying-out subroutine of the e-mail editing process of FIG. 26.

FIG. 26 is a flowchart showing an e-mail editing process of the output terminals 17a, 17b. FIG. 27 is a flowchart of an initialization subroutine in the e-mail editing process of FIG. 26. FIG. 28 is a flowchart of a stamp type retrieving subroutine in the e-mail editing process of FIG. 26. FIG. 29 is a flowchart of a name retrieving subroutine in the e-mail editing process of FIG. 26. FIG. 30 is a flowchart of an address retrieving subroutine in the e-mail editing process of FIG. 26. FIG. 31 is a flowchart of a delivery point retrieving subroutine in the e-mail editing process of FIG. 6. FIG. 32 is a flowchart of a buffer laying-out subroutine in the e-mail editing process of FIG. 26.

FIG. 33 shows an example of a screen of an e-mail editing program displayed on the display of the output terminal 17a or 17b.

In step S101 of FIG. 21, customers 11a, 11b operate their respective cellular phones 12a, 12b to compose e-mail, containing text data for a personalized stamp. E-mail is composed, in the same manner as that of the first exemplary embodiment, that is, by following a predetermined rule for delimiting each entry text item by a semicolon.

In the third exemplary embodiment, the customers 11a, 11b may select a delivery point for the stamp 20. The stamp delivery point may be arbitrarily selected from, for example, two locations "1=exit" and "2=front of Ferris wheel". Thus, the e-mail composed in this exemplary embodiment contains four entry items: the stamp type; entry item 1, for example, a name; entry item 2, for example, an address; and the stamp delivery point.

In step S102, the customer 11a may press an e-mail transmission button of the cellular phone 12a to transmit the e-mail composed in step S101 to the cellular phone 15.

In step S103, the cellular phone 15 receives the e-mail transmitted from the cellular phones 12a, 12b. The e-mail received by the cellular phone 15 is then loaded into the host computer 18 using the e-mail loading program. The loaded e-mail is stored in the RAM 83 of the host computer 18. Each piece of e-mail received by the host computer 18 may include in its header, data representing the e-mail sender's cellular phone number, non-text data representing the stamp type, name, address, and delivery point entered in step S101.

In step S103, e-mail for acknowledging receipt of e-mail or for notifying of an estimated completion time for a personalized stamp may be returned to the respective cellular phones 12a, 12b of the customers 11a, 11b. This obviates the need for the customers 11a, 11b to wait for the stamp 20 at a delivery place.

In step S104, the e-mail loaded into the host computer 18 in step S103 is transferred, as described below, to either of the cellular phones 16a or 16b connected to the output terminals 17a, 17b, respectively, using the e-mail transfer program and the e-mail unloading program. As shown in FIG. 22, the e-mail transfer process includes three steps: initialization, step S41; retrieval of delivery point, step S42; and e-mail transfer to delivery point, step S43. These steps will be described with reference to FIGS. 23 through 25.

In the initialization step S41 of FIG. 22, a read-pointer stored in the RAM of the host computer 18 for indicating an e-mail read-point is moved to the end of the body of a piece of e-mail to be edited, as shown in step S410 of FIG. 23.

In the delivery point retrieving step S42 of FIG. 22, the contents of the delivery point buffer in the RAM are cleared, as shown in step S420 of FIG. 24. In step S421, a delivery point buffer write-pointer that indicates a data write-point in the delivery point buffer is initialized. In step S422, text code at a point indicated by the read-pointer is then retrieved from the body of the piece of e-mail. In step S423, it is determined whether the text code is a delimiting symbol, for example, a semicolon ";", for text entry item.

When the text code is a delimiting symbol as shown in step S423: YES, control goes to step S429 on the assumption that the delivery point data has already been retrieved. In step S429, it is determined whether the data retrieved and stored in the delivery point buffer is data representing the delivery point, for example, "1" or "2" in this exemplary embodiment. As a result, when the data stored in the delivery point buffer is the data representing the delivery point, as shown in step S429: YES, this subroutine is completed, based on the assumption that the data representing the delivery point has been correctly retrieved. When the data stored in the delivery point buffer is not the data representing the delivery point, as shown in step S429: NO, control goes to step S425, where error handling is performed.

However, when the text code is not a delimiting symbol, as shown in step S423: NO, control goes to step S424 on the assumption that the delivery point has not yet been retrieved. In step S424, it is determined whether the read-pointer is at the head of the piece of e-mail. When the read-pointer is at the head of the piece of e-mail, as shown in step S424: YES, control goes to step S425, where error handling is performed.

When the read-pointer is not at the head of the piece of e-mail, as shown in step S424: NO, the text code retrieved in step S422 is written into the delivery point buffer in step S426. In the step S427, the read-pointer is then decremented by one and, in step S428, the delivery point buffer write-pointer is also decremented by one. Subsequently, control returns to step S422. By iterating these steps, the text code representing the delivery point, for example, "1" or "2" in this exemplary embodiment is written into the delivery point buffer in the RAM of the host computer 18.

When e-mail is transferred to the delivery point, as shown in step S43 of FIG. 22, it is determined, in step S430 of FIG. 25, whether "1" is contained in the delivery point buffer. When a "1" is present, as shown in step S430: YES, control goes to step S431, where the host computer 18 transmits data to the cellular phone 15, using the e-mail unloading program, in order to transfer a received piece of e-mail to the destination cellular phone 16a, associated with the delivery point "1" in this embodiment. The data is then transmitted as a piece of e-mail destined for the cellular phone 16a and has the same body as the body of the data transmitted from the cellular phone 12a or 12b. When "2" is present in the delivery point buffer, as shown in step S430: NO of FIG. 25, control goes to step S432, where the host computer 18 transmits data to the cellular phone 15, using the e-mail unloading program, in order to transfer a received piece of e-mail to the destination cellular phone 16b, for example, in front of Ferris wheel in this example, associated with the delivery point "2". The data is transmitted as a piece of e-mail destined for the cellular phone 16b and has the same body as the body of the data transmitted from the cellular phone 12a or 12b.

In step S105 of FIG. 21, the cellular phone 15 then transmits the piece of e-mail received from the host computer 18 to the destination cellular phone 16a or 16b, via the base station 13a, or alternatively via the switching station 14, and the base station 13b. In step S106, the cellular phone 16a or 16b receives the transferred piece of e-mail and stores it in its RAM 63.

In step S107 of FIG. 21, the output terminal 17a or 17b then loads, using the e-mail loading program, the piece of e-mail from the cellular phone 16a or 16b and stores it in its RAM 83.

Instep S108 of FIG. 21, the e-mail editing program selects a piece of e-mail to be edited from a list of pieces of e-mail, as shown by the example of the e-mail editing program screen of FIG. 33, stored in the RAM 83 of the output terminal 17a or 17b. The selected piece of e-mail is then processed, using the e-mail editing program as described below. The e-mail editing process, as shown in FIG. 26, includes six steps: initialization, step S81; retrieval of stamp type, step S82; retrieval of name, step S83; retrieval of address, step S84; retrieval of delivery point, step S85; and buffer-layout, step S86. These steps will be described with reference to FIGS. 27 through 32.

In the initialization step S81 of FIG. 26, and as further shown in step S810 of FIG. 28, a read-pointer stored in the RAM 83 of the output terminal 17a or 17b for indicating an e-mail read-point is moved to the head of the body of the piece of e-mail to be edited.

In the stamp type retrieving step S82, the contents of the stamp type buffer in the RAM 83 are cleared in step S820, as shown in FIG. 28. In step S821, a stamp type buffer write-pointer for indicating a data write-point in the stamp type buffer is initialized. In step S822 of FIG. 28, text code at a point indicated by the readpointer is retrieved from the body of the piece of e-mail. In step 823, it is determined whether the text code is a delimiting symbol, for example, a semicolon ";", for a text entry item.

When the text code is a delimiting symbol, as shown in step S823: YES of FIG. 28, control goes to step S824 on the assumption that the stamp type data has already been retrieved. In step S824, it is determined whether the data retrieved and stored in the stamp type buffer is data representing the stamp type, for example, "1" or "2" in this exemplary embodiment. When the data stored in the stamp type buffer is the data representing the stamp type, as shown in step S824: YES, control goes to step S821 on the assumption that the data representing the stamp type has been correctly retrieved, and the read-pointer is incremented by one and this subroutine is completed. When the data stored in the stamp type buffer is not the data representing the stamp type, as shown in step S824: NO, control goes to step S826, where error handling is performed.

However, when the text code is not a delimiting symbol, as shown in step S823: NO, control goes to step S825 on the assumption that the stamp type has not yet been retrieved. In step S825, it is determined whether the text code retrieved in step S822 is a code attached to and indicative of the end of the body of the piece of e-mail or whether retrieval of a text code failed in step S822. When the text code is determined to be a code indicative of the end of the body of the piece of e-mail, as shown in step S825: YES, control goes to step S826, where error handling is performed.

In step S827, when the text code is determined not to be a code indicative of the end of the body of the piece of e-mail, as shown in step S825: NO, the text code retrieved in step S822 is written into the stamp type buffer. In the step S828, the read-pointer is then incremented by one and, in step S829, the stamp type buffer write-pointer is also incremented by one. Subsequently, control returns to step S822. By iterating these steps, the text code representing the stamp type, for example, "1" or "2" in this exemplary embodiment, is written into the stamp type buffer in the RAM 83 of the output terminal 17a or 17b.

In the name retrieving step S83 of FIG. 26, the contents of the name buffer, for example, name buffer 0 in the RAM 83 are cleared in step S830, as shown in FIG. 29. In step S831, the name buffer 0 write-pointer for indicating a data writepoint in the name buffer 0 is initialized. In step S832, a text code at a point indicated by the read-pointer is retrieved from the body of the piece of e-mail. In step 833 it is determined whether the text code is a delimiting symbol, for example, a semicolon ";", for a text entry item.

When the text code is a delimiting symbol, as shown in step S833: YES, control goes to step S834 on the assumption that the name data has already been retrieved. In step S834, the read-pointer is incremented by one and this subroutine is completed. However, when the text code is not a delimiting symbol, as shown in step S833: NO, control goes to step S835 on the assumption that the name data has not yet been retrieved. In step S835, it is determined whether the text code retrieved in step S832 is a code attached to and indicative of the end of the body of the piece of e-mail or whether retrieval of a text code failed in step S832. When the text code is a code indicative of the end of the body of the piece of e-mail, as shown in step S835: YES, control goes to step S836, where error handling is performed.

In step S837, when the text code is not a code indicative of the end of the body of the piece of e-mail, as shown in step S835: NO, the text code retrieved in step S832 is written into the name buffer 0. In step S838, the read-pointer is then incremented by one and, in step S839, the name buffer 0 write-pointer is also incremented by one. Subsequently, control returns to step S832. By iterating these steps, text data representing the name entered by the customer is written into the name buffer 0 in the RAM 83 of the output terminal 17a or 17b.

In the address retrieving step S84 of FIG. 26, the contents of the address buffer 0 in the RAM 83 are cleared in step S840, as shown in FIG. 30. In step S841, an address buffer 0 write-pointer for indicating a data write-point in the address buffer 0 is initialized. In step S842, text code at a point indicated by the read-pointer is retrieved from the body of the piece of e-mail. In step 843, it is determined whether the text code is a delimiting symbol, for example, a semicolon ";", for a text entry item.

When the text code is a delimiting symbol, as shown in step S843: YES, control goes to step S844 on the assumption that the address data has already been retrieved. In step S844, the read-pointer is incremented by one and this subroutine is completed. When the text code is not a delimiting symbol, as shown in step S843: NO, control goes to step S845 on the assumption that the address data has not yet been retrieved.

In step S845, it is determined whether the text code is attached to and indicative of the end of the body of the piece of e-mail, or whether retrieval of a text code failed in step S842. When the text code is a code indicative of the end of the body of the piece of e-mail, as shown in step S845: YES, control goes to step S846, where error handling is performed.

When the text code is not a code indicative of the end of the body of the piece of e-mail, as shown in step S845: NO, the text code retrieved in step S842 is written into the address buffer 0 in step S847. In step S848, the read-pointer is then incremented by one and, in step S849, the address buffer 0 write-pointer is also incremented by one. Subsequently, control returns to step S842. By iterating these steps, text data representing the address entered by the customer is written into the address buffer 0 in the RAM 83 of the output terminal 17*a* or 17*b*.

In the delivery point retrieving step S85 of FIG. 26, the contents of the delivery point buffer in the RAM 83 are cleared in step S850, as shown in FIG. 31. In step S851, a delivery point write-pointer for indicating a data write-point in the delivery point buffer is initialized. In step S852, text code at a point indicated by the read-pointer is retrieved from the body of the piece of e-mail.

In step S853, it is determined whether the text code is a code attached to and indicative of the end of the body of the piece of e-mail or whether retrieval of a text code failed in step S852. When the text code is a code indicative of the end of the body of the piece of e-mail, as shown in step S853: YES, this subroutine is completed on the assumption that the delivery point data has already been retrieved.

When the text code is not a code indicative of the end of the body of the piece of e-mail, as shown in step S853: NO, the text code retrieved in step S852 is written into the delivery point buffer in step S854. In step S855, the read-pointer is then incremented by one and, in step S856, the delivery point buffer write-pointer is also incremented by one. Subsequently, control returns to step S852. By iterating these steps, text data representing the delivery point entered by the customer is written into the delivery point buffer in the RAM 83 of the output terminal 17*a* or 17*b*.

In the buffer laying-out step S86 of FIG. 26, it is determined whether, for example, "1" or "2" is written into the stamp type buffer in the RAM 83 of the output terminal 17*a* or 17*b*. When the stamp type is "1", as shown in step S860: YES, the name buffer 1 and the address buffer 1 in the RAM 83 are cleared in step S861 of FIG. 32. The contents of the name buffer 0 are written into the name buffer 1 in step S862, and the contents of the address buffer 0 are written into the address buffer 1 in step S863. However, when the stamp type is "2", as shown in step S860: NO, the name buffer 2 and the address buffer 2 in the RAM 83 are cleared in step S864. Then, the contents of the name buffer 0 are written into the name buffer 2 in step S865, and the contents of the address buffer 0 are written into the address buffer 2 in step S866. In this way, the buffers are laid out and the e-mail editing step is completed.

In this exemplary embodiment, the delivery point data is contained in each piece of e-mail transmitted from the host computer 18. In addition, the delivery point data is retrieved and entered into the output terminal 17*a* or 17*b* in step S85. Step S85 is not necessary but allows the output terminal 17*a* or 17*b* to confirm the stamp delivery point.

Control then goes back to step S109 of FIG. 21, where, from among the data edited in step S108, the contents of the stamp type buffer, the contents of the name buffer 1 or 2, whichever has been more recently updated, and the contents of the address buffer 1 or 2, whichever has been more recently updated are transmitted to the stamp producing device 19*a* or 19*b* as the stamp producing data.

The stamp producing device 19*a* or 19*b* receives the stamp producing data from the output terminal 17*a* or 17*b* and stores it in the RAM 93 of the stamp producing device. The CPU 91 generates dot matrix data for engraving the stamp-face by referring to the data for letters and data for a graphic design, for example, a cartoon character stored in the ROM 92, based on the stamp producing data stored in the RAM 93, and stores the dot matrix data in an image buffer of the RAM 93. Then the stamp 20 of FIG. 17, having an ordered stamp-face, as shown in FIG. 16, is produced by the stamp producing device 19.

In step S110, the stamp 20 may be provided to the customer for cash on delivery.

As described above, in the third exemplary embodiment, the customers 11*a*, 11*b* can select a more convenient location for a stamp delivery point from, for example, two locations, and get the stamp 20 at a location closer to the customers 11*a*, 11*b*.

Also, in the third exemplary embodiment, orders from the customers 11*a*, 11*b* are centralized in the host computer 18. This allows the customers 11*a*, 11*b* to send data to the single host computer 18, without the bother of selecting one of the output terminals 17*a*, 17*b* as a destination for data transmission, which will then be a delivery point. As a result, erroneously destined data transmission is prevented. Also, order management can be performed only by the host computer 18.

Also, in this third exemplary embodiment, because stamp producing data is generated and transmitted using the cellular phones 12*a*, 12*b*, the customers 11*a*, 11*b* can order a stamp conveniently from various locations at their convenience.

Furthermore, as shown in this third exemplary embodiment, a wireless receiver, for example, a cellular phone, is connected to the host computer 18 and the output terminals 17*a*, 17*b*. Such a configuration allows the host computer 18 and the output terminals 17*a*, 17*b* to be installed in locations within the cellular phone service area, where connection to a public line is difficult or impossible. Accordingly, the installation sites of these devices can be easily selected and the environment for the host computer 18 and the output terminals 17*a*, 17*b* to receive data can be built at a lower cost.

Figure 34:
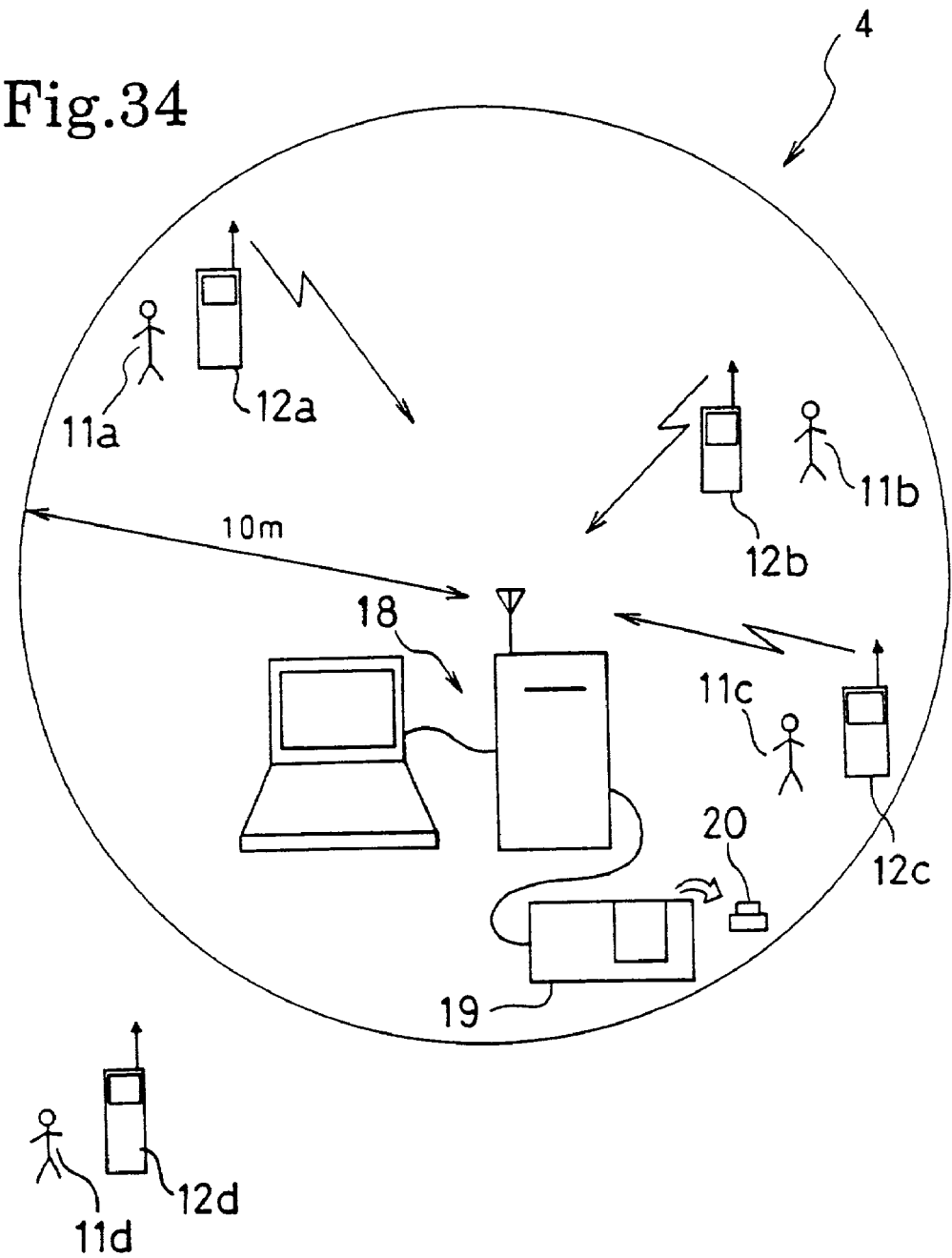
FIG. 34 is a schematic diagram, showing configuration of the stamp producing system, according to a fourth exemplary embodiment of the invention.

Lastly, a stamp providing system according to a fourth exemplary embodiment of the invention will be described with reference to the schematic diagram of FIG. 34. As shown in FIG. 34, a stamp producing device 19, located within a relatively short range from a number of customers, for example, only four consumers 11*a*-11*d* are shown here by way of example, produces a stamp 20, based on stamp producing data transmitted using a wireless short-range data transmission technique, such as, for example, Bluetooth, from cellular phones 12*a*-12*d*, which are portable wireless data receivers/transmitters operated by the respective consumers 11*a*-11*d*. The cellular phones 12*a*-12*d* used in this exemplary embodiment have, aside from a function of receiving/transmitting voice by converting it to digital signals, a function of receiving/transmitting textual information by converting it to code data from or to other computers and cellular phones that adopt the same wireless shortrange data transmission technique.

In this exemplary embodiment, code data sent from the cellular phones 12*a*-12*d* is sent to a host computer 18 connected to the stamp producing device 19. The code data contains text data to be engraved on a stamp material of the stamp 20. The data, containing textual information and sent from the cellular phones 12a-12d as digital signals, is directly received by the host computer 18, which adopts the same wireless short-range data transmission technique as that adopted by the cellular phones 12a-12d.

In the fourth exemplary embodiment, a wireless short-range data communication technique is adopted as a data communication interface between the cellular phones 12a-12d and the host computer 18. This allows only cellular phones located within a relatively short range from the host computer 18 to communicate with the host computer 18. For example, if Bluetooth using a carrier frequency band of 2.4 GHz is adopted as the wireless short-range data communication technique, only cellular phones located within approximately 10 m from the host computer 18 can communicate with the host computer 18. Thus, as shown in FIG. 34, the cellular phones 12a, 12b, 12c may transmit data to the host computer 18, but the cellular phone 12d cannot. The adoption of, for example, Bluetooth advantageously enables high-speed data transmission between cellular phones and the host computer 18 at approximately 1M bit/second even when there is an obstruction therebetween.

In the fourth exemplary embodiment, the host computer 18 and the stamp producing device 19 constitute a personalized product producing device.

Figure 35:
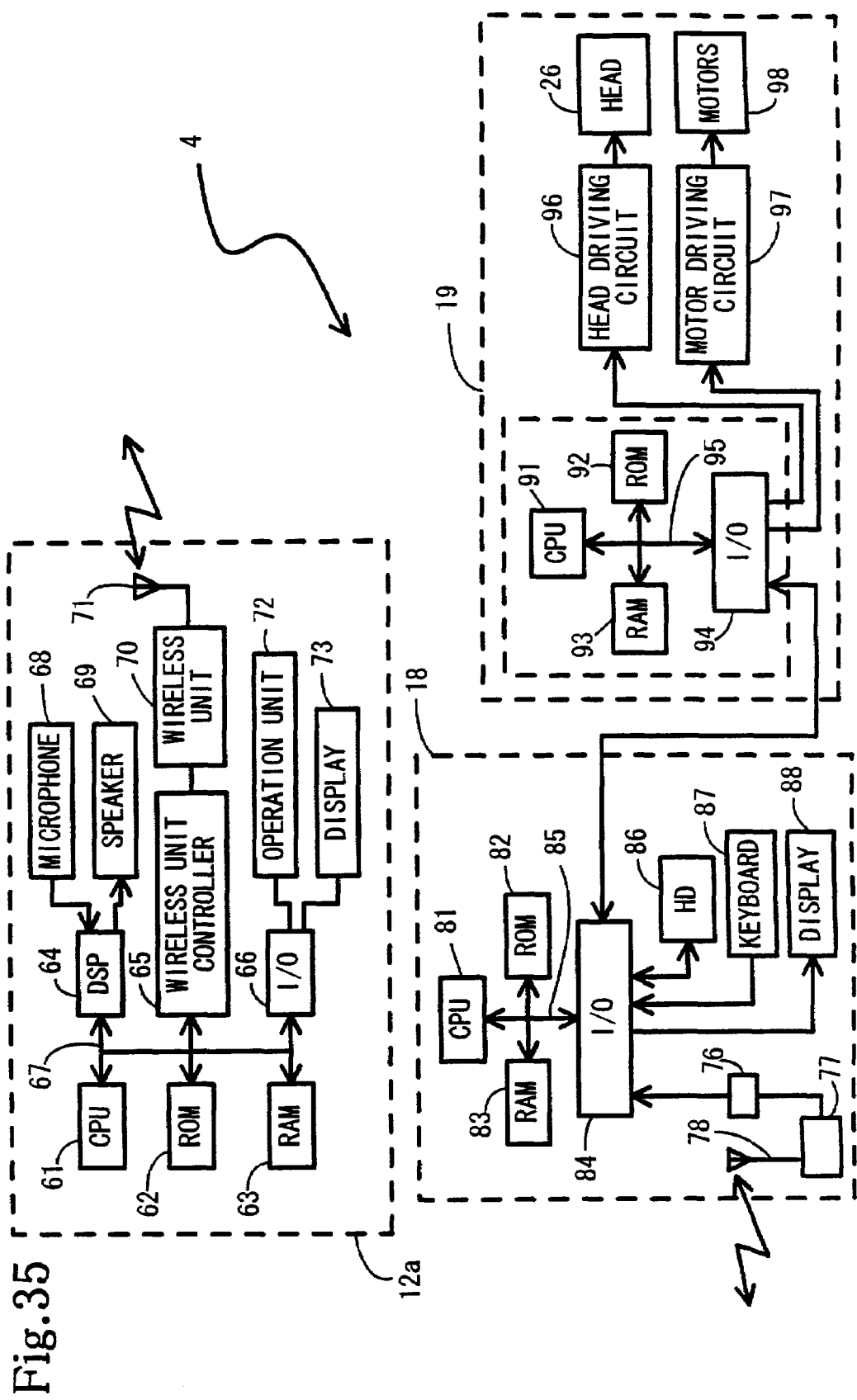
FIG. 35 is a block diagram, showing the control system of the stamp producing system, according to the fourth exemplary embodiment of the invention.

Referring to the block diagram of FIG. 35, a control system of the stamp providing system 4, according to the fourth exemplary embodiment, will be described. In FIG. 35, only one cellular phone 12a of a number of cellular phones, usable in the stamp providing system 4 according to the fourth exemplary embodiment, is representatively shown. Elements structurally similar to those in the first exemplary embodiment have the same reference numbers and a detailed description thereof will be omitted.

The cellular phone 12a in this exemplary embodiment differs from the first exemplary embodiment in that its wireless unit 70 is structured in conformity with a short-range wireless data transmission standard, such as, Bluetooth, and transmits voice data and text data, as digital signals, from an antenna 71 to an antenna 78 of the host computer 18. Conversely, the wireless unit 70 is also used to directly receive data transmitted from the host computer 18 via the antenna 71.

Similar to the wireless unit 70 of the cellular phone 12a, the wireless unit 77 of the host computer 18 in this exemplary embodiment is also structured in conformity with the short-range wireless data transmission standard, such as, Bluetooth. The wireless unit 77 receives data transmitted from the cellular phones 12a-12d via the antenna 78. Conversely, the wireless unit 77 is also used to transmit voice data and text data, as digital signals, from the antenna 78 to the cellular phones 12a-12d. In accordance with a signal sent from CPU 81, a wireless unit controller 76 controls the wireless unit 77 which is connected thereto.

Referring to FIG. 36, the stamp producing steps in the stamp producing system 4, according to the fourth exemplary embodiment will be described. The steps identified by the same names, as in the first exemplary embodiment, involve the same processes as in the first exemplary embodiment, and thus, a detailed description of the processes will be omitted.

In step 201, the customers 11a-11d operate the operation unit 72 of their respective cellular phones 12a-12d to create a data file including text data for a personalized stamp.

In step S202, the consumer 11a presses a data transmission button of the cellular phone 12a to transmit the data file created in step S201 to the host computer 18.

When the cellular phones 12a-12d are located within a predetermined range from the host computer 18, for example, within approximately 10 m for Bluetooth, as shown in step S203: YES of FIG. 36, control goes to step S204. However, when the cellular phones 12a-12d are not located within the predetermined range from the host computer 18, as shown in step S203: NO, control returns to S202. During creation of a data file in step S201, however, cellular phones are not required to be located within the predetermined range from the host computer 18, and consumers, if they have a cellular phone, can create a data file for ordering a personalized stamp anytime and anywhere.

In step S204, the host computer 18 directly receives the data file transmitted from the cellular phones 12a-12d. The received data file is stored in the RAM 83 of the host computer 18.

In step S205, the host computer 18 starts a data editing program installed therein and selects a data file to edit from a list of received data files. In step S206, the host computer 18 edits the selected data file in step S205, using the data editing program.

In step S207, the data edited in step S206 is supplied to the stamp producing device 19. The stamp producing device 19 receives the stamp producing data from the host computer 18 and stores it in the RAM 93 of the stamp producing device. The CPU 91 generates dot matrix data for engraving the stamp-face by referring to data for letters and data for a graphic design, for example, a cartoon character, stored in the ROM 92, based on the stamp producing data stored in the RAM 93, and stores the dot matrix data in an image buffer in the RAM 93. The stamp 20, shown in FIG. 17, having a personalized engraved stamp-face as shown in FIG. 16 is produced by the stamp producing device 19. Finally, in step S208, the stamp 20 may be delivered to the customer 11a for cash on delivery.

As described above, in the fourth exemplary embodiment, because the range that permits communication between the cellular phones 12a-12d and the host computer 18 is limited to a relatively short range, operators of the cellular phones 12a-12d must actually go to a location close to the host computer 18 to order the stamp 20. Thus, customers cannot get the personalized stamp 20 produced by the stamp producing device 19 without going to a location close to the host computer 18. As compared with the case where data is sent, in the form of e-mail, from the cellular phones 12a-12d to the host computer 18 via a base station and a public line, the host computer 18 can receive orders only from customers located within an extremely small range.

The fourth exemplary embodiment is suitable for use in an amusement facility. As a specific application of the fourth exemplary embodiment to an amusement facility, the host computer 18 and the stamp producing device 19 or another personalized product producing device may be installed in each pavilion of an amusement facility so that a different stamp, name card or sticker/label is produced in each pavilion. Customers may then stop at all pavilions to gather all types of stamps.

In this exemplary embodiment, the data transmitted from the cellular phones 12a-12d bypasses a base station and a public line and is directly received by the host computer 18. Thus, there is no need to pay communication fees to a cellular phone service company and a public line company, and the cost of communication between the cellular phones 12a-12d and the host computer 18 can be significantly reduced.

While the invention has been described in connection with specific exemplary embodiments, it should be understood that the invention is not limited to the above-described exemplary embodiments and various modifications can be made without departing from the scope of the invention as defined in the claims. For example, if a name card producing device, instead of the stamp producing device, is connected to the host computer 18, a name card producing system can be configured. Also, compact discs, in which voice is recorded can be provided using a voice data recorder and a personal compact disc producing device, or sticker/labels with an image printed thereon can be provided using a device for producing a sticker/label upon receipt of image data.

Although, in the first, second, and third exemplary embodiments, the electronic mailing system where e-mail is automatically sent to the host computer 18 is described by way of example, another electronic mailing system can be used where e-mail is stored in an e-mail server separate from the host computer 18 and is received by the host computer 18 by access to the e-mail server. Also, in the above-described exemplary embodiments, the number of text entry items and the types of the stamp designs can be arbitrarily changed.

Further, a device used by a customer to transmit e-mail is not limited to a cellular phone, and any device can be used if it is capable of wireless transmission. For example, e-mail may be transmitted using a mobile computer or a Personal Digital Assistant (PDA). Instead of wireless transmission using a cellular phone or Bluetooth, infrared wireless communication in conformity with IrDA (Infrared Data Association) standards may be used.

Although, in the fourth exemplary embodiment, the data receiver and the personalized product producing device are adjacent to each other or function as a combined pair of devices, the data receiver and the personalized product producing device may be located far from one another, if data transmission can be accomplished therebetween by wired communication or long-range wireless communication. When a number of data receivers and a number of personalized product producing devices are located far from one another and configured to enable data transmission therebetween, a personalized product may be produced at a designated delivery point as in the third exemplary embodiment.

Although, in the fourth exemplary embodiment, data transmission from the host computer 18 to each customer is performed by short-range wireless communication, such as, for example, Bluetooth, data transmission from the host computer 18 may be performed by long-range communication. Especially, when acknowledgment of receipt of an order from a customer and notification of completion of an order may reliably be made by long-range communication.

What is claimed is:

1. An automated method of providing a personalized product in response to each request from customers, the automated method comprising the steps of:
preparing electronic personalized product producing data on a portable hand-held device based on instructions provided to a customer prior to preparing the electronic personalized product producing data, the electronic personalized product producing data including text data and type of the personalized product, the text data includes data to be recorded on the personalized product;
sending the personalized product producing data in a first format from the portable hand-held device by wireless communication to a producing facility;
receiving, by wireless communication, the electronic personalized product producing data in the first format and customer identification information;
electronically sequentially storing sets of the personalized product producing data and the customer identification information, each set including a piece of personalized product producing data and a piece of customer identification information;
automatically and electronically analyzing each piece of the personalized product producing data in the first format and converting it to a piece of electronic data in a second format;
receiving the piece of electronic data in the second format and recording the piece of electronic data in the second format on an output medium used to produce a personalized product;
producing the personalized product based on the piece of electronic data in the second format at a location to be specified by the electronic personalized product producing data; and
automatically notifying the customer of at least one of receipt of the electronic personalized product producing data and completion of the personalized product requested, wherein the automated method incorporates the request and producing of the personalized product taking place within a facility where the customer is located, and delivery of the personalized product to the customer at the location where the personalized product is produced.

2. The method of providing a personalized product in response to each request from customers according to claim 1, further comprising the step of delivering the personalized product produced to a location within the limited, defined geographic area or facility designated by each piece of customer identification information.

3. The automated method according to claim 1, further comprising:
storing the produced personalized product in association with the customer information; and
authenticating each of the customers based on the customer information; and, upon confirmation of authenticity of each of the customers,
providing the stored personalized product associated with the customer information to each of the customers.

4. The automated method according to claim 3, wherein at least the producing and the storing are paired in each of a plurality of locations within the limited, defined geographic area or facility, each piece of e-mail received from each of the customers contains information about a personalized product producing device's location, designated by each of the customers, and furthering including:
analyzing the data about the personalized product producing device's location, and
transferring the image data to the personalized product producing device Installed in a designated producing location, the personalized product producing device at the designated location producing the requested personalized product, and a storage device installed in the designated personalized product producing device, stodng the produced personalized product.

5. The automated method according to claim 1, wherein a personalized product producing system is installed In a plurality of locations within the limited, defined geographic area or facility, and a receiver for receiving the wireless communication is installed in each of the plurality of locations and is allowed to receive only wireless communications transmitted from the customers within an area associated with each location of the plurality of locations.

6. The automated method according to claim 1, further comprising:

calculating upon receipt of each wireless communication, a number of wireless communications already received and operation conditions of a personalized product producing device, an estimated time of completion of the requested personalized product; and automatically returning a wireless communication including the estimated time of completion to each of the customers.

7. The automated method according to claim 1 further comprising:

receiving the personalized product by the customer at the location where production of the personalized product occurs.

8. The method of providing a personalized product in response to each request from customers according to claim 1, wherein the personalized product is one of a stamp, name card, and sticker/label.

9. An automated method of providing a personalized product in response to each request from customers, the automated method comprising the steps of:

preparing electronic personalized product producing data on a portable hand-held device based on instructions provided to a customer, the electronic personalized product producing data including text data and type of the personalized product, the text data includes data to be recorded on the personalized product:

sending the personalized product producing data in a first format from the portable hand-held device by wireless communication to a producing facility;

receiving, by wireless communication, electronic personalized product producing data in the first format and customer identification information;

electronically sequentially storing sets of the electronic personalized product producing data and the customer identification information, each set including a piece of personalized product producing data and a piece of customer identification information;

automatically and electronically analyzing each piece of the personalized product producing data in the first format and converting it to a piece of electronic data in a second format;

receiving the piece of electronic data in the second format and recording the piece of electronic data in the second format on an output medium used to produce a personalized product selected from the group consisting of a stamp, name card, and sticker/label;

producing the personalized product based on the piece of electronic data in the second format at a location specified by the electronic personalized product producing data; and automatically notifying the customer of at least one of receipt of the electronic personalized product producing data and completion of the personalized product requested, wherein the automated method incorporates the request and producing of the personalized product taking place within a facility where the customer is located, and delivery of the personalized product to the customer at the location where the personalized product is produced.

10. The method of providing a personalized product in response to each request from customers according to claim 1, wherein within the facility, there are a plurality of producing facilities.

11. The method of providing a personalized product in response to each request from customers according to claim 10, wherein each of the plurality of producing facilities produces a different personalized product.

12. The method of providing a personalized product in response to each request from customers according to claim 9, wherein within the facility, there are a plurality of producing facilities.

13. The method of providing a personalized product in response to each request from customers according to claim 12, wherein each of the plurality of producing facilities produces a different personalized product.

* * * * *